(12) United States Patent
Gao et al.

(10) Patent No.: US 12,707,459 B2
(45) Date of Patent: Aug. 11, 2026

(54) METHODS, DEVICES AND COMPUTER STORAGE MEDIA FOR COMMUNICATION

(71) Applicant: NEC CORPORATION, Tokyo (JP)

(72) Inventors: Yukai Gao, Beijing (CN); Peng Guan, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 231 days.

(21) Appl. No.: 18/288,737

(22) PCT Filed: Apr. 29, 2021

(86) PCT No.: PCT/CN2021/090951

§ 371 (c)(1),
(2) Date: Oct. 27, 2023

(87) PCT Pub. No.: WO2022/226885

PCT Pub. Date: Nov. 3, 2022

(65) Prior Publication Data

US 2024/0215019 A1 Jun. 27, 2024

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0048* (2013.01); *H04W 52/146* (2013.01); *H04W 72/232* (2023.01)

(58) Field of Classification Search
CPC ........... H04W 72/232; H04W 72/1268; H04W 52/146; H04L 5/0048
See application file for complete search history.

(56) References Cited

U.S. PATENT DOCUMENTS

2016/0056933 A1* 2/2016 Aiba .................... H04L 1/1861 370/329
2020/0296736 A1* 9/2020 Yokomakura ......... H04L 5/0051
2021/0111847 A1* 4/2021 Yang .................... H04L 5/0023

FOREIGN PATENT DOCUMENTS

CN 112166563 A 1/2021
WO WO-2020150943 A1 * 7/2020 .............. H04W 8/22

OTHER PUBLICATIONS

"Enhancements on Multi-TRP for PDCCH, PUCCH and PUSCH", Samsung, 3GPP TSG RAN WG1 #104b-e, R1-2103222, Apr. 2021, 15 pages.

(Continued)

*Primary Examiner* — Zhubing Ren
(74) *Attorney, Agent, or Firm* — Sughrue Mion, PLLC

(57) ABSTRACT

Embodiments of the present disclosure relate to a method, device and computer readable storage medium of communication. The method comprises receiving at a terminal device a DCI for scheduling at least one PUSCH transmission from a network device. The DCI comprises a first field indicating that the at least one PUSCH transmission is to be transmitted based on a SRS resource set from a plurality of SRS resource sets or the plurality of SRS resource sets, and a second field indicating an index of the single SRS resource set for transmitting the at least one PUSCH transmission. The method further comprises transmitting, by the terminal device, the at least one PUSCH transmission based on the DCI to the network device. In this way, when supporting dynamic switching between single-TRP transmission and multi-TRP transmission, the newly-introduced overhead may be minimized.

9 Claims, 10 Drawing Sheets

(51) Int. Cl.
*H04W 52/14* (2009.01)
*H04W 72/232* (2023.01)

(56) References Cited

OTHER PUBLICATIONS

International Search Report for PCT/CN2021/090951 dated Jan. 27, 2022.
Written Opinion for PCT/CN2021/090951 dated Jan. 27, 2022.

* cited by examiner

300

| Bit field for the first field | Indication |
| --- | --- |
| 0 | multi-TRP transmission/a plurality of SRS resource sets |
| 1 | single-TRP transmission/single SRS resource set |

| Bit field for the second field | Indication |
| --- | --- |
| B_i | the first TRP/SRS resource set if the single-TRP transmission/single SRS resource set is indicated by the first field |
| B_i+1 | the second TRP/SRS resource set if the single-TRP transmission/single SRS resource set is indicated by the first field |
| B_i+2 (if present) | Reserved if the single-TRP transmission/single SRS resource sets is indicated in the first field |

| Bit field for the first field | Indication |
|---|---|
| 0 | multi-TRP transmission/a plurality of SRS resource sets |
| 1 | single-TRP transmission/single SRS resource set |

Fig. 4

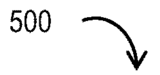

| Bit field for the first field | Indication |
|---|---|
| 0 | multi-TRP transmission/a plurality of SRS resource sets |
| 1 | single-TRP transmission/single SRS resource set |

Fig. 5A

| Bit field for the second field | Indication |
|---|---|
| 0 | the first TRP/SRS resource set if the single-TRP transmission/single SRS resource set is indicated by the first field |
| 1 | the second TRP/SRS resource set if the single-TRP transmission/single SRS resource set is indicated by the first field |

Fig. 5B

| Bit field for the first field | Indication |
|---|---|
| 00 | multi-TRP transmission/a plurality of SRS resource sets |
| 01 | single-TRP transmission/single SRS resource set with the first TRP/SRS resource set |
| 10 | single-TRP transmission/single SRS resource set with the second TRP/SRS resource set |
| 00 | Reserved |

| Bit field for the first field | Indication |
| --- | --- |
| 00 | multi-TRP transmission/a plurality of SRS resource sets, and second TRP with a first parameter set (such as, the first OLPC parameter set) |
| 01 | single-TRP transmission/single SRS resource set with the first TRP/SRS resource set |
| 10 | single-TRP transmission/single SRS resource set with the second TRP/SRS resource set |
| 00 | multi-TRP transmission/a plurality of SRS resource sets, and second TRP with a second parameter set (such as, the second OLPC parameter set) |

Fig. 7

METHODS, DEVICES AND COMPUTER STORAGE MEDIA FOR COMMUNICATION

FIELD

Embodiments of the present disclosure generally relate to the field of telecommunication, and in particular, to methods, devices and computer storage media for communication.

BACKGROUND

Technology of multiple input multiple output (MIMO) has been widely used in current wireless communication system, where of a large number of antenna elements are used by a network device for communicating with a terminal device. Further, in order to improve the reliability and robustness of the communication between the network device and the terminal device, technology of multi-Transmission and Reception Point (multi-TRP) (as well as multi-panel reception) has been proposed and discussed recently. Generally speaking, downlink control information (DCI) may be used by the network device to indicate the scheduling information to the terminal device. Some proposals about the DCI for enabling multi-TRP and/or multi-panel have been discussed and some agreements have been reached.

Recently, enhancements on the support for multi-TRP deployment have been discussed. For example, it has been proposed to identify and specify features to improve reliability and robustness for physical channels (such as, Physical Downlink Control Channel (PDCCH), Physical Uplink Shared Channel (PUSCH) and/or Physical Uplink Control Channel (PUCCH)) other than Physical Downlink Shared Channel (PDSCH) using multi-TRP and/or multi-panel with Release 16 reliability features as a baseline. In order to improve reliability and robustness for PUSCH, single or same DCI can be used to schedule PUSCH transmissions based on multi-TRP and/or multi-panel. It has been agreed that the maximum number of sounding reference signal (SRS) resource sets can be increased to two and two SRS resource indicator fields corresponding to two SRS resource sets can be introduced in DCI which schedules PUSCH transmissions. In addition, two transmission precoding matrix indicator (TPMI) field can be introduced in DCI for scheduling PUSCH transmission. It is further proposed that a dynamic switching between multi-TRP and/or multi-panel and single-TRP should be supported. Therefore, it would be desirable to propose a solution for supporting dynamic switching between single-TRP transmission and multi-TRP transmission without introducing significant overhead.

SUMMARY

In general, example embodiments of the present disclosure provide methods, devices and computer storage media for communication.

In a first aspect, there is provided a method of communication. The method comprises receiving at a terminal device a DCI for scheduling at least one Physical Uplink Shared Channel (PUSCH) transmission from a network device. The DCI comprises a first field indicating that the at least one PUSCH transmission is to be transmitted based on a single SRS resource set from a plurality of SRS resource sets or the plurality of SRS resource sets, and a second field indicating an index of the single SRS resource set for transmitting the at least one PUSCH transmission. The method further comprises transmitting, by the terminal device, the at least one PUSCH transmission based on the DCI to the network device.

In a second aspect, there is provided a method of communication. The method comprises transmitting, at a network device, DCI for scheduling at least one PUSCH transmission to the terminal device. The DCI comprises a first field indicating that the at least one PUSCH transmission is to be transmitted based on a single SRS resource set from a plurality of SRS resource sets or the plurality of SRS resource sets, and a second field indicating an index of the single SRS resource set for transmitting the at least one PUSCH transmission. The method further comprises receiving the at least one PUSCH transmission transmitted based on the DCI from the terminal device.

In a third aspect, there is provided a method of communication. The method comprises receiving, at a terminal device a DCI for scheduling at least one PUSCH transmission from a network device. The DCI comprises a third field enabling indicating information for the at least one PUSCH transmission. The information comprises whether the at least one PUSCH transmission is to be transmitted based on a single SRS resource set or a plurality of SRS resource sets, an index of the single SRS resource set when transmitting the at least one PUSCH transmission based on the single SRS resource set, and at least one parameter set corresponding to at least one of the plurality of SRS resource sets when transmitting the at least one PUSCH transmission based on the plurality of SRS resource sets. The method further comprises transmitting the at least one PUSCH transmission based on the DCI to the network device.

In a fourth aspect, there is provided a method of communication. The method comprises transmitting, at a network device and to a terminal device, DCI for scheduling at least one PUSCH transmission. The DCI comprises a third field enabling indicating information for the at least one PUSCH transmission. The information comprises whether the at least one PUSCH transmission is to be transmitted based on a single SRS resource set or a plurality of SRS resource sets, an index of the single SRS resource set when transmitting the at least one PUSCH transmission based on the single SRS resource set, and at least one parameter set corresponding to at least one of the plurality of SRS resource sets when transmitting the at least one PUSCH transmission based on the plurality of SRS resource sets. The method further comprises receiving, from the terminal device, the at least one PUSCH transmission transmitted based on the DCI.

In a fifth aspect, there is provided a terminal device. The terminal device comprises circuitry configured to perform the method according to the above first aspect of the present disclosure.

In a sixth aspect, there is provided a network device. The network device comprises circuitry configured to perform the method according to the above second aspect of the present disclosure.

In a seventh aspect, there is provided a terminal device. The terminal device comprises circuitry configured to perform the method according to the above third aspect of the present disclosure.

In an eighth aspect, there is provided a network device. The network device comprises circuitry configured to perform the method according to the above fourth aspect of the present disclosure.

In a ninth aspect, there is provided a computer program product comprising machine-executable instructions. The machine-executable instructions, when being executed, cause a machine to perform the method according to any of the above first to fourth aspects of the present disclosure.

In a tenth aspect, there is provided a computer readable medium having instructions stored thereon. The instructions, when executed on at least one processor, causing the at least one processor to perform the method according to any of the above first to fourth aspects of the present disclosure.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIGS. 3A and 3B illustrate examples of the first and second fields of the present disclosure, respectively;

FIG. 4 illustrates an example of the first field of the present disclosure;

FIGS. 5A and 5B illustrate examples of the first and second fields of the present disclosure, respectively;

FIG. 7 illustrates an example of the first field of the present disclosure;

Throughout the drawings, the same or similar reference numerals represent the same or similar element.

DETAILED DESCRIPTION

Figure 1A:
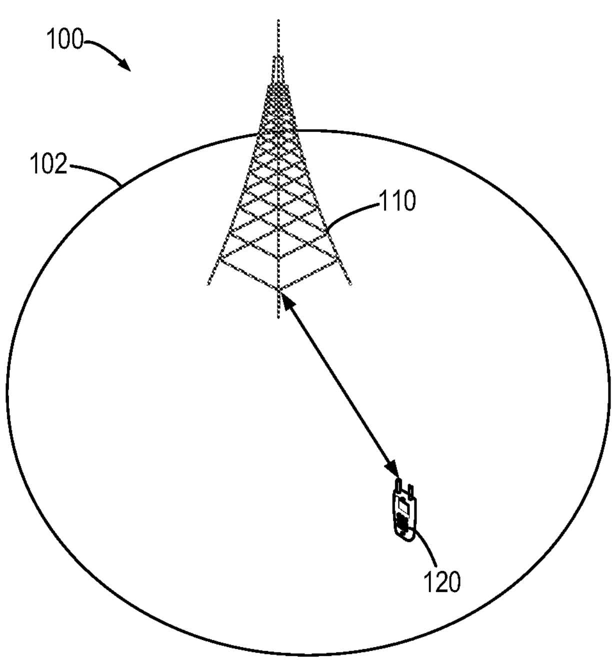
FIGS. 1A and 1B illustrate an example communication network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. The term 'based on' is to be read as 'at least in part based on.'

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, the term "determine/determining" (and grammatical variants thereof) can include, not least: calculating, computing, processing, deriving, measuring, investigating, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IOT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (cNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As used herein, the term "TRP" refers to an antenna array (with one or more antenna elements) available to the network device located at a specific geographical location. Although some embodiments of the present disclosure are described with reference to multiple TRPs for example, these embodiments are only for the purpose of illustration and help those skilled in the art to understand and implement the present disclosure, without suggesting any limitations as to the scope of the present disclosure. It is to be understood that the present disclosure described herein can be implemented in various manners other than the ones described below.

Generally speaking, one TRP usually corresponds to one SRS resource set. As used herein, the term "single-TRP" refers to that a single SRS resource set is used for performing related transmissions (such as, PUSCH transmissions), and the term "multi-TRP" refers to that a plurality of SRS resource sets are used for performing related transmissions (such as, PUSCH transmissions).

In the following, the terms "PUSCH transmission", "uplink transmission", "PUSCH repetition", "PUSCH occasion" and "PUSCH reception" can be used interchangeably. The terms "DCI" and "DCI format" can be used interchangeably. The terms "transmission", "transmission occasion" and "repetition" can be used interchangeably. The terms "precoder", "precoding", "precoding matrix", "beam", "spatial relation information", "spatial relation info", "TPMI", "precoding information", "precoding information and number of layers", "precoding matrix indicator (PMI)", "precoding matrix indicator", "transmission precoding matrix indication", "precoding matrix indication", "TCI state", "transmission configuration indicator", "quasi co-location (QCL)", "quasi-co-location", "QCL parameter" and "spatial relation" can be used interchangeably.

As discusses above, in order to improve the reliability and robustness of the communication between the network device and the terminal device, technology of multi-TRP (as well as multi-panel reception) has been proposed and discussed recently. Specifically, some agreements about enhancement on the support for multi-TRP deployment have been reached, comprising:

- Identify and specify features to improve reliability and robustness for physical channels (such as, PDCCH, PUSCH and/or PUCCH other than PDSCH) using multi-TRP and/or multi-panel with Release 16 reliability features as a baseline;
- Identify and specify features to enable inter-cell multi-TRP operations; and
- Evaluate and, if needed, specify enhancements for simultaneous multi-TRP transmission with multi-panel reception.

Therefore, channels other than PDSCH can benefit from multi-TRP transmission (as well as multi-panel reception).

In conventional solutions, in order to improve reliability and robustness for PUSCH, single or same DCI can be used to schedule PUSCH transmission(s) based on multi-TRP and/or multi-panel.

Further, as discussed previously, it is further proposed that a dynamic switching between multi-TRP and/or multi-panel and single-TRP should be supported recently. Therefore, it would be desirable to propose a solution for supporting dynamic switching between single-TRP transmission and multi-TRP transmission without introducing significant overhead.

In accordance with some example embodiments of the present disclosure, there is provided a solution for communication. In this solution, the terminal device receives a DCI for scheduling at least one PUSCH transmission from the network device. The DCI comprises a first field indicating that the at least one PUSCH transmission is to be transmitted based on a SRS resource set from a plurality of SRS resource sets or the plurality of SRS resource sets, and a second field indicating an index of the single SRS resource set for transmitting the at least one PUSCH transmission. Further, the terminal device transmits the at least one PUSCH transmission based on the DCI to the network device. In this way, when supporting dynamic switching between single-TRP transmission and multi-TRP transmission, the newly-introduced overhead may be minimized.

FIG. 1A illustrates an example communication network 100 in which embodiments of the present disclosure can be implemented. The communication network 100 includes a network device 110 and a terminal device 120 served by the network device 110. Further, the serving area provided by the network device 110 is called as serving cell 102. The network 100 may provide one or more serving cells 102 to serve the terminal device 120. The terminal device 120 can communicate with the network device 110 via one or more physical communication channels or links.

In the communication network 100, a link from the terminal device 120 to the network device 110 is referred to as an uplink (UL), while a link from the network device 110 to the terminal device 120 is referred to as a downlink (DL). In UL, the terminal device 120 is a TX device (or a transmitter) and the network device 110 is a RX device (or a receiver). In DL, the network device 110 is a transmitting (TX) device (or a transmitter) and the terminal device 120 is a receiving (RX) device (or a receiver).

In the specific example of FIG. 1A, the network device 110 may schedule the UL transmissions (such as, PUSCH transmissions) via such as DCI. In the following text, the example message used for scheduling PUSCH transmissions is discussed with DCI. It is to be understood that a Radio Resource Control (RRC) message/signaling and a Medium Access Control (MAC) control element (CE) message/signaling may also be used for scheduling PUSCH transmissions.

The communications in the communication network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

It is to be understood that the numbers of network devices, terminal devices and/or serving cells are only for the purpose of illustration without suggesting any limitations to the present disclosure. The communication network 100 may include any suitable number of network devices, terminal devices and/or serving cells adapted for implementing implementations of the present disclosure. It would also be appreciated that in some examples, only the homogeneous network deployment or only the heterogeneous network deployment may be included in the communication network 100.

In addition, in order to support multi-TRP and/or multi-panel, the network device 110 may be equipped with one or more TRPs. For example, the network device 110 may be coupled with multiple TRPs in different geographical locations to achieve better coverage. One or more TRPs of the multiple TRPs may be included in a same serving cell or different serving cells. It is to be understood that the TRP can also be a panel, and the panel can also refer to an antenna array (with one or more antenna elements).

In one embodiment, the terminal device 120 may be connected with a first network device (such as, the ne) and a second network device (not shown in FIG. 1A). One of the first network device and the second network device may be in a master node and the other one may be in a secondary node. The first network device and the second network device may use different radio access technologies (RATs). In one embodiment, the first network device may be a first RAT device and the second network device may be a second RAT device. In one embodiment, the first RAT device may be an eNB and the second RAT device is a gNB. Information related to different RATs may be transmitted to the terminal device 120 from at least one of the first network device and the second network device. In one embodiment, first information may be transmitted to the terminal device 120 from the first network device and second information may be transmitted to the terminal device 120 from the second network device directly or via the first network device. In one embodiment, information related to configuration for the terminal device configured by the second network device may be transmitted from the second network device via the first network device. Information related to reconfiguration for the terminal device 120 configured by the second network device may be transmitted to the terminal device 120 from the second network device directly or via the first network device. The information may be transmitted via any of the following: RRC signaling, MAC CE or DCI.

Figure 1B:
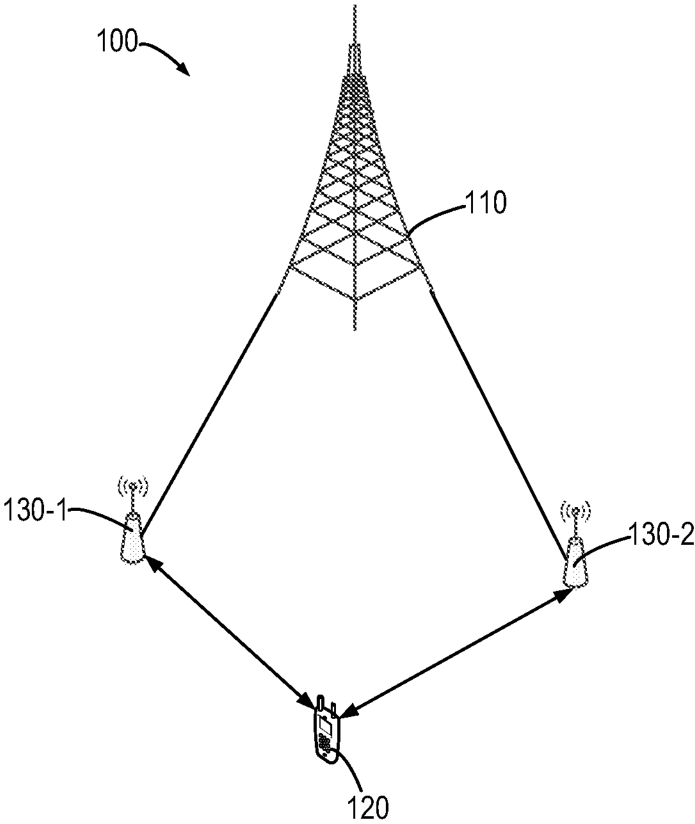

FIG. 1B shows an example scenario of the communication network 100 as shown in FIG. 1A. As shown in FIG. 1B, the network device 110 may communicate with the terminal device 120 via TRPs 130-1 and 130-2 (collectively referred to as TRPs 220). In the following text, the TRP 130-1 may be also referred to as the first TRP, while the TRP 130-2 may be also referred to as the second TRP. The first and second TRPs 130-1 and 130-2 may be included in a same serving cell (such as, the serving cell 102 as shown in FIG. 1A) or different serving cells provided by the network device 110.

It is to be understood that the numbers of network devices, terminal devices and/or TRPs are only for the purpose of illustration without suggesting any limitations to the present disclosure. The communication network 100 may include any suitable number of network devices, terminal devices and/or TRPs adapted for implementing implementations of the present disclosure.

In the following text, although some embodiments of the present disclosure are described with reference to two TRPs and the first and second TRPs 130-1 and 130-2 within a same serving cell provided by the network device 110, these embodiments are only for the purpose of illustration and help those skilled in the art to understand and implement the present disclosure, without suggesting any limitations as to the scope of the present disclosure. It is to be understood that the present disclosure described herein can be implemented in various manners other than the ones described below.

In some example embodiments, there may be M TRPs serving the terminal device 120, where M is a positive integer. For example, $1 \le M \le 4$. For another example, M=2. In some example embodiments, for each of the M TRPs, the terminal device 120 may be configured with at least one of the following: a control resource set (CORESET), a SRS resource set, a set of spatial relation information, a transmission configuration indicator (TCI) state, and a set of QCL parameters. That is, the terminal device 120 may be configured with M CORESETs, M SRS resource sets, M sets of spatial relation information, M TCI states and/or M sets of QCL parameters associated with M TRPs respectively. One of the M TRPs can be represented by a corresponding one of the M CORESETs, the M SRS resource sets, the M sets of spatial relation information, the M TCI states and/or the M sets of QCL parameters.

In some example embodiments, the SRS resource sets are configured for codebook based uplink transmission. In some example embodiments, the SRS resource sets are configured for non-codebook based uplink transmission. In the example as shown in FIG. 1B, M=2. In this case, the first TRP 130-1 may be associated with a first CORESET, a first SRS resource set, first spatial relation information, a first TCI state and/or a first set of QCL parameters, while the second TRP 130-2 may be associated with a second CORESET, a second SRS resource set, second spatial relation information, a second TCI state and/or a second set of QCL parameters.

In the specific example of FIG. 1B, the first and second TRPs 130-1 and 130-2 correspond to different SRS resource sets. In the following text, the SRS resource set corresponding to the first TRP 130-1 may be referred to as the first SRS resource set, while the SRS resource set corresponding to the second TRP 130-2 may be referred to as the second SRS resource set.

Further, the DCI for scheduling the PUSCH of the terminal device 120 may comprise a plurality of SRS resource indicator (SRI) fields corresponding to the plurality of SRS resource sets. In the specific example of FIG. 1B, the DCI may comprise two SRI fields. In the following text, the SRI field corresponding to the first SRS resource set may be referred to as the first SRI field, while the SRI field corresponding to the second SRS resource set may be referred to as the second SRI field.

In addition, in the specific example of FIG. 1B, codebook based PUSCH transmission and/or non-codebook based PUSCH transmission are supported. For single DCI based multi-TRP PUSCH repetition scheme, non-codebook based PUSCH transmissions can be scheduled by DCI format 0_0, DCI format 0_1, DCI format 0_2 or semi-statically configured parameters, where the DCI or the parameters may comprise the first and second SRI fields corresponding to first and second SRS resource sets, respectively. Additionally, for non-codebook based PUSCH transmissions, the first SRI field may be based on the legacy structure (such as, the structure as specified in Release 15/16 of 3rd Generation Partnership Project (3GPP)), and may be used to indicate the number of SRS resources, the number of transmission layers (also referred to as "transmission rank"), and the likes. The second SRI field may only indicate the number of SRS resources, the number of transmission layers is assumed to be the same that of the first SRI field.

Additionally, for non-codebook based multi-TRP PUSCH transmissions, the first SRI field is used to determine the entry of the second SRI field which only contains the SRI(s) combinations corresponding to the indicated rank (i.e., number of layers) of the first SRI field. The number of bits, $N_2$, for the second SRI field is determined by the maximum number of codepoint(s) per rank among all ranks associated with the first SRI field. For each rank x, the first Kx codepoint(s) are mapped to Kx SRIs of rank x associated with the first SRI field, the remaining ($2^{N_2}$−Kx) codepoint(s) are reserved. For example, $N_2$ may be 1 or 0, when there is one SRS resource in a SRS resource set for non-codebook based transmission. For example, the SRS resource set may be the second SRS resource set.

In some example embodiments, the terminal device 120 may determine its PUSCH precoder and transmission rank based on the SRI when multiple SRS resources are configured, where the SRI is given by the SRS resource indicator in DCI format 0_1 and DCI format 0_2, or the SRI is given by a higher layer parameter, for example srs-ResourceIndicator. The SRS-ResourceSet(s) applicable for PUSCH scheduled by DCI format 0_1 and DCI format 0_2 are defined by the entries of the higher layer parameter srs-ResourceSetToAddModList and srs-ResourceSetToAddModListDCI-0-2 in SRS-config, respectively. The terminal device 120 may use one or more SRS resources for SRS transmission, where the maximum number of SRS resources in a SRS resource set and the maximum number of SRS resources that can be configured to the terminal device 120 for simultaneous transmission in a same symbol depend on capabilities of terminal device 120. The SRS resources transmitted simultaneously occupy the same resource blocks (RBs). For each SRS resource, only one SRS port may be configured. One or two SRS resource sets can be configured with the higher layer parameter usage in SRS-ResourceSet set to 'nonCodebook'. The maximum number of SRS resources in a SRS resource set that can be configured for non-codebook based uplink transmission may be 4. The indicated SRI in slot n may be associated with the most recent transmission of SRS resource(s) identified by the SRI, where the SRS transmission is prior to the PDCCH carrying the SRI.

As for single DCI based M-TRP PUSCH repetition schemes, codebook based PUSCH transmissions can be scheduled by DCI format 0_0, DCI format 0_1, DCI format 0_2 or semi-statically configured parameters. The DCI or the parameters may comprise the first and second SRI fields corresponding to first and second SRS resource sets, respectively. Additionally, the DCI may comprise two TPMI fields corresponding to the first and second TRP 130-1 and 130-2, respectively. The TPMI is used to indicate the precoder to be applied over the layers $\{0 \ldots v-1\}$ and that corresponds to the SRS resource selected by the SRI when multiple SRS resources are configured. Alternatively, if a single SRS resource in one SRS resource set is configured, TPMI is used to indicate the precoder to be applied over the layers $\{0 \ldots v-1\}$ and that corresponds to the SRS resource. In some example embodiments, the first TPMI field may include TPMI index and the number of layers, while the second TPMI field only includes the second TPMI index. The same number of layers as indicated in the first TPMI field is applied to the second TPMI field.

Further, for codebook based (CB) multi-TRP PUSCH transmission, the first TPMI field is used to determine the entry of the second TPMI field, while the second TPMI field only contains TPMIs corresponding to the indicated rank (number of layers) of the first TPMI field. The bit width of the second TPMI field, $M_2$, is determined by the maximum number of TPMIs per rank among all ranks associated with the first TPMI field. For each rank y, the first $K_y$ codepoint(s) of the second TPMI field are mapped to $K_y$ TPMI(s) of rank y associated with the first TPMI field in increasing order codepoint index, the remaining ($2^{M_2}$−$K_y$) codepoint(s) are reserved. For example, $M_2$ may be 1 or 0, when the number of ports is 1 for the SRS resource(s) in a SRS resource set for codebook based transmission. For example, the SRS resource set may be the second SRS resource set.

In some example embodiments, the terminal device 120 may determine its PUSCH transmission precoder based on the SRI, the TPMI and the transmission rank, where the SRI, the TPMI and the transmission rank are given by DCI fields of SRS resource indicator, precoding information and the number of layers in DCI format 0_1 and 0_2, or given by higher layer parameters, for example, srs-ResourceIndicator and precodingAndNumberOfLayers. The SRS-ResourceSet(s) applicable for PUSCH scheduled by DCI format 0_1 and DCI format 0_2 are defined by the entries of the higher layer parameter srs-ResourceSetToAddModList and srs-ResourceSetToAddModListDCI-0-2 in SRS-config, respectively. The TPMI is used to indicate the precoder to be applied over the layers $\{0 \ldots v-1\}$ and that corresponds to the SRS resource selected by the SRI when multiple SRS resources are configured. Alternatively, if a single SRS resource is configured, TPMI is used to indicate the precoder to be applied over the layers $\{0 \ldots v-1\}$ and that corresponds to the SRS resource. The transmission precoder is selected from the uplink codebook that has a number of antenna ports equal to the higher layer parameter nrofSRS-Ports in SRS-config. When the terminal device 120 is configured with the higher layer parameter txConfig set to 'codebook', the terminal device 120 may be configured with at least one SRS resource. The indicated SRI in slot n may be associated with the most recent transmission of SRS resource identified by the SRI, where the SRS resource is prior to the PDCCH carrying the SRI.

Additionally, in some example embodiments, the DCI may comprise a plurality of transmission power control (TPC) field. In the specific example of FIG. 1B, the plurality of TPC fields may comprise a first TPC field and a second TPC field.

In some embodiments, the network device 110 may configure a plurality of SRS resource sets (for example, the plurality of SRS resource sets may be 1 or 2 for codebook based uplink/PUSCH transmission. For another example, the plurality of SRS resource sets may be 1 or 2 for non-codebook based uplink/PUSCH transmission) to the terminal device 120 (for example, a first SRS resource set to be applied for PUSCH transmissions via the first TRP 130-1 and a second SRS resource set to be applied for PUSCH transmissions via the second TRP 130-2). In some example embodiments, the network device 110 may configure codebook based uplink/PUSCH transmission to the terminal device 120, and the network device 110 may configure one or two SRS resource sets to the terminal device 120. For example, the one or two SRS resource sets are applied for codebook based uplink/PUSCH transmission. In some example embodiments, the network device 110 may configure non-codebook based uplink/PUSCH transmission to the terminal device 120, and the network device 110 may configure one or two SRS resource sets to the terminal device 120. For example, the one or two SRS resource sets are applied for non-codebook based uplink/PUSCH transmission. In some example embodiments, the network device 110 may transmit DCI to the terminal device 120 for scheduling at least one PUSCH transmission. In some example embodiments, the DCI may comprise a plurality of SRI fields corresponding to the plurality of SRS resources sets. For example, the plurality of SRI fields may comprise a first SRI field and a second SRI field. Additionally, or in addition, the DCI may comprise a plurality of TPMI fields for codebook uplink/PUSCH transmission (for example, the first TPMI field and second TPMI field). Additionally, or in addition, the DCI may comprise a plurality of TPC fields (for example, a first TPC field and a second TPC field).

In addition, a dynamic switching between multi-TRP and/or multi-panel and single-TRP may be supported. More specifically, if single-TRP transmission with the first TRP 130-1 is dynamically indicated by DCI, the first SRS resource set is to be applied for PUSCH transmissions. If single-TRP transmission with the second TRP 130-2 is to be dynamically indicated by DCI, the second SRS resource set may be applied for PUSCH transmissions. Alternatively, if multi-TRP transmission is dynamically indicated, the first and second SRS resource sets may be applied for PUSCH transmissions.

Additionally, the multi-TRP transmission may be associated with an order of the TRPs (i.e., an order of multiple SRS resource sets to be applied for PUSCH transmission). One example of the order is that the terminal device 120 applies the first SRS resource set for the first PUSCH transmission/repetition of the at least one PUSCH transmission. Another example of the order is that the terminal device 120 applies the second SRS resource set for the first PUSCH transmission/repetition of the at least one PUSCH transmission.

In some example embodiments, the terminal device 120 may be configured/indicated/scheduled with a set of PUSCH transmissions. The set of PUSCH transmissions may comprise a first subset of PUSCH transmissions and a second subset of PUSCH transmissions. In some example embodiments, the precoder for the first subset of PUSCH transmissions/repetitions may be determined based on at least one of the first SRI indicated by the first SRI field, the first TPMI/PMI field and the transmission rank. The precoder for the second subset of PUSCH transmissions/repetitions may be determined based on at least one of the second SRI indicated by the second SRI field, the second TPMI/PMI field and the transmission rank.

In some example embodiments, at least one SRS resource in the first SRS resource set may be applied for or associated with the first subset of PUSCH transmissions and at least one SRS resource in the second SRS resource set may be applied for or associated with the second subset of PUSCH transmissions. In some example embodiments, the first subset of PUSCH transmissions or the precoder for the first subset of PUSCH transmissions may be based on or correspond to at least one SRS resource in the first SRS resource set and the second subset of PUSCH transmissions or the precoder for the second subset of PUSCH transmissions may be based on or correspond to at least one SRS resource in the second SRS resource set.

In some example embodiments, the first one of PUSCH transmission or the first one of the first subset of PUSCH transmissions may start and/or end earlier than the first one of PUSCH transmission or the first one of the second subset of PUSCH transmissions in time domain.

In some example embodiments, the terminal device 120 may be configured/indicated with a configuration/indication for the association/application between the SRI field and the subset of PUSCH transmissions (or the precoder for the subset of PUSCH transmissions). In some example embodiments, the terminal device 120 may be configured/indicated with a first configuration/indication that the precoder for the first subset of PUSCH transmissions/repetitions may be determined based on at least one of the first SRI indicated by the first SRI field, the first TPMI/PMI field and the transmission rank, and the precoder for the second subset of PUSCH transmissions/repetitions may be determined based on at least one of the second SRI indicated by the second SRI field, the second TPMI/PMI field and the transmission rank. The terminal device 120 may be configured/indicated with a second configuration/indication that the precoder for the second subset of PUSCH transmissions/repetitions may be determined based on at least one of the first SRI indicated by the first SRI field, the first TPMI/PMI field and the transmission rank, and the precoder for the first subset of PUSCH transmissions/repetitions may be determined based on at least one of the second SRI indicated by the second SRI field, the second TPMI/PMI field and the transmission rank.

In some example embodiments, the terminal device 120 may be configured/indicated with a configuration/indication for the association/application between the SRS resource set and the subset of PUSCH transmissions (or the precoder for the subset of PUSCH transmissions). In some example embodiments, the terminal device 120 may be configured/indicated with a first configuration/indication that at least one SRS resource in the first SRS resource set may be applied for or associated with the first subset of PUSCH transmissions and at least one SRS resource in the second SRS resource set may be applied for or associated with the second subset of PUSCH transmissions. The terminal device 120 may be configured/indicated with a second configuration/indication that at least one SRS resource in the second SRS resource sets may be applied for or associated with the first subset of PUSCH transmissions and at least one SRS resource in the first SRS resource set may be applied for or associated with the second subset of PUSCH transmissions. In some example embodiments, the terminal device 120 may be configured/indicated with a first configuration/indication that the first subset of PUSCH transmissions or the precoder for the first subset of PUSCH transmissions may be based on or correspond to at least one SRS resource in the first SRS resource sets and the second subset of PUSCH transmissions or the precoder for the second subset of PUSCH transmissions may be based on or correspond to at least one SRS resource in the second SRS resource set. The terminal device 120 may be configured/indicated with a second configuration/indication that the first subset of PUSCH transmissions or the precoder for the first subset of PUSCH transmissions may be based on or correspond to at least one SRS resource in the second SRS resource sets and the second subset of PUSCH transmissions or the precoder for the second subset of PUSCH transmissions may be based on or correspond to at least one SRS resource in the first SRS resource set.

In some example embodiments, the configuration/indication may be configured/indicated explicitly or implicitly via at least one of RRC, MAC CE and DCI. In some example embodiments, the first configuration/indication may be different from the second configuration/indication. For example, the configuration/indication may be explicitly transmitted via at least one of RRC, MAC CE and DCI. For another example, the configuration/indication may be implicitly indicated by some parameters. For example, the parameters may include, but being not limited to, at least one of the following: of the SRI indicated by the SRI field in DCI, the precoding information and the number of layers indicated in DCI, antenna ports indicated in DCI, DMRS configurations, the DMRS port index, the first DMRS port index and the code domain multiplexing (CDM) group index.

Figure 2:
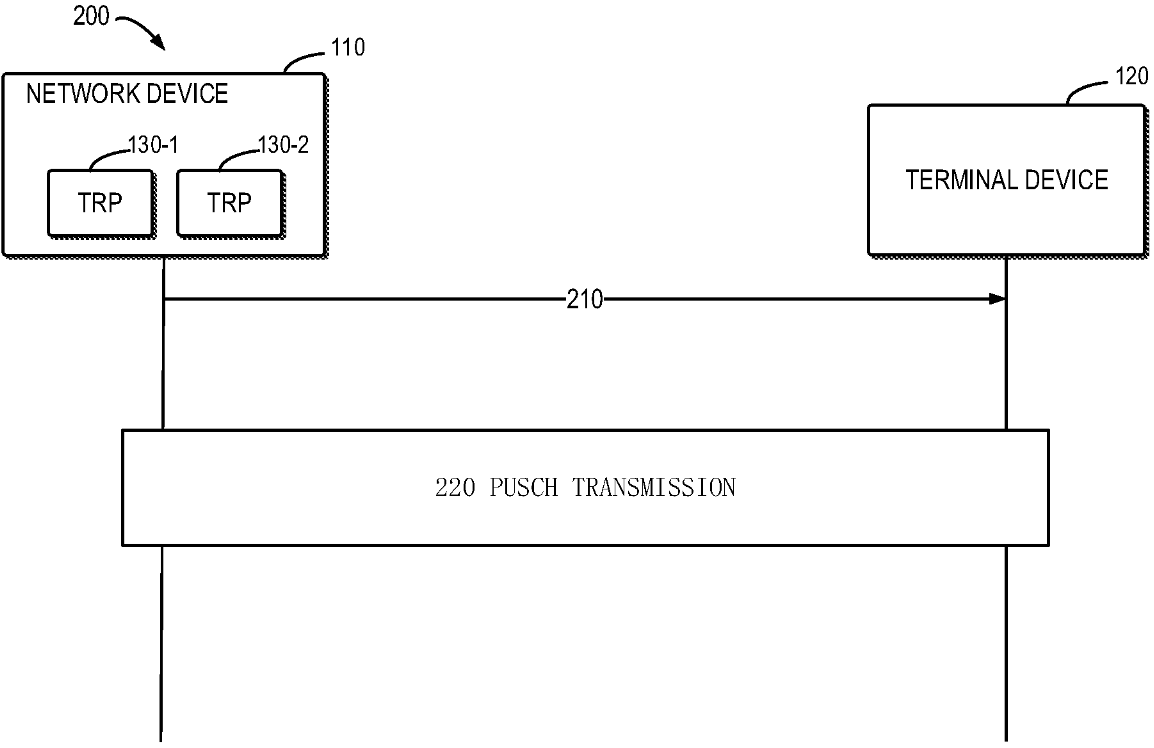
FIG. 2 illustrates a signaling flow for communication according to some example embodiments of the present disclosure.

Example embodiments of the present disclosure will be described in detail below with reference to the FIGS. 2-11, where FIG. 2 shows a signaling flow 200 for communication according to some example embodiments of the present disclosure, FIGS. 3A-7 are examples of the first field or the second field according to some example embodiments of the present disclosure, and FIGS. 8-11 are flowcharts of example methods performed by the terminal device 120 or the network device 110.

It is to be understood that the correspondence between the values and the descriptions illustrated in FIGS. 3A-7 are only for the purpose of illustration without suggesting any limitations to the present disclosure. In other example embodiments, the correspondence may be re-defined.

Further, it is to be understood that the correspondence should be known to the network device 110 and the terminal device 120 in advance. Specifically, the network device 110 and the terminal derive 120 may store/configure the correspondence locally. Additionally, the correspondence may be implemented as by the terminal device 120 and the network device 110 as computer program code or configuration file in a storage device.

In some example embodiments, the correspondence may be pre-defined/pre-configured/pre-stipulated by the standards of wireless communication (such as, 3GPP standard). In this event, no additional interaction between the network device 110 and the terminal device 120 is needed.

In some other example embodiments, the correspondence may be pre-defined/pre-configured/pre-stipulated by the operator of the communication network, or the service provider. In this event, the terminal device 120 may obtain the correspondence from the network device 110 via such as, a RRC message, a MAC CE, or a physically layer message. Then, the terminal device 120 may store the correspondence in a local storage device.

Reference is now made to FIG. 2. For the purpose of discussion, the signaling flow 200 will be described with reference to FIGS. 1A and 1B. The signaling flow 200 may involve the network device 110, the terminal device 120, the first TRP 130-1 and the second TRP 130-2.

In the specific example of FIG. 2, the network device 110 transmits 210 DCI for scheduling at least one PUSCH transmission to the terminal device 120. The DCI comprises a first field indicating that the at least one PUSCH transmission is to be transmitted based on a single SRS resource set (for example, the first SRS resource set or the second SRS resource set) or a plurality of SRS resource sets (for example, both the first SRS resource set and the second SRS resource set). In the following text, PUSCH transmissions being transmitted based on single SRS resource set is referred to as signal-TRP, while PUSCH transmissions being transmitted based on a plurality of SRS resource sets is referred to as multi-TRP.

In case that the first field indicates that the at least one PUSCH transmission is to be transmitted based on the single SRS resource set, the network device 110 further indicates an index of the single SRS resource set. In some example embodiments, the DCI further comprises a second field indicating an index of the single SRS resource set for transmitting the at least one PUSCH transmission. In case that the first field indicate that the at least one PUSCH transmission is to be transmitted based on a plurality of SRS resource sets, the indexes of the plurality of SRS resource sets are unnecessary and do not need to be indicated.

In some example embodiments, the second field may be one of the first SRI field, the second SRI field, the first TPMI field, the second TPMI field, the first TPC field, the second TPC field, a first open loop power control (OLPC) parameter set indication field and a second OLPC parameter set indication field in the DCI. In some example embodiments, the second field may be a combination of at least one of the first SRI field, the second SRI field, the first TPMI field, the second TPMI field, the first TPC field, the second TPC field, a OLPC parameter set indication field and a second OLPC parameter set indication field, if present, in the DCI.

In some example embodiments, the network device 110 may configure codebook based uplink/PUSCH transmission to the terminal device 120, and the network device 110 may configure two SRS resource sets (for example, a first SRS resource set and a second SRS resource set) to the terminal device 120 for codebook based uplink/PUSCH transmission.

In some example embodiments, when the first field indicates that the at least one PUSCH transmission is to be transmitted based on one of the plurality of SRS resource sets (such as, the first and second resource sets), the second field is applied to indicate the first SRS resource set or the second SRS resource set is applied for the at least one PUSCH transmission. In some example embodiments, two codepoints in the second field is applied for the indication. For example, a first codepoint in the second field is applied to indicate the first SRS resource set applied for the at least one PUSCH transmission, and a second codepoint in the second field is applied to indicate the second SRS resource set applied for the at least one PUSCH transmission. For another example, if more than 2 codepoints are included in the second field, the other codepoints except the first codepoint and the second codepoint are reserved. In some example embodiments, when the value of the second field is all “0”, the first SRS resource set is applied for the at least one PUSCH transmission, and when the value of the second field is all “1”, the second SRS resource set is applied for the at least one PUSCH transmission.

In some example embodiments, when the first field indicates that the at least one PUSCH transmission is to be transmitted based on both of the first and second SRS resource sets, the second field is applied to indicate SRI(s) based on the first SRS resource set (for example, the second field is the first SRI field) or applied to indicate SRI(s) based on the second SRS resource set (for example, the second field is the second SRI field) or applied to indicate precoding information and number of layers for the first subset of PUSCH transmission(s) (for example, the second field is the first TPMI field) or applied to indicate precoding information for the second subset of PUSCH transmission(s) (for example, the second field is the second TPMI field) or applied to indicate the TPC command for the first subset of PUSCH transmission(s) (for example, the second field is the first TPC field) or applied to indicate TPC command for the second subset of PUSCH transmission(s) (for example, the second field is the second TPC field) or applied to indicate OLPC parameters for the first subset of PUSCH transmission (s) (for example, the second field is the first OLPC parameter set indication field) or applied to indicate OLPC parameters for the second subset of PUSCH transmission (s) (for example, the second field is the second OLPC parameter set indication field).

In some example embodiments, the network device 110 may configure non-codebook based uplink/PUSCH transmission to the terminal device 120, and the network device 110 may configure two SRS resource sets (for example, a third SRS resource set and a fourth SRS resource set) to the terminal device 120 for non-codebook based uplink/PUSCH transmission.

In some example embodiments, when the first field indicates that the at least one PUSCH transmission is to be transmitted based on one of the two SRS resource sets, the second field is applied to indicate the third SRS resource set or the fourth SRS resource set is applied for the at least one PUSCH transmission. In some example embodiments, two codepoints in the second field is applied for the indication. For example, a first codepoint in the second field is applied to indicate the third SRS resource set applied for the at least one PUSCH transmission, and a second codepoint in the second field is applied to indicate the fourth SRS resource set applied for the at least one PUSCH transmission. For another example, if more than 2 codepoints are included in the second field, the other codepoints except the first codepoint and the second codepoint are reserved. In some example embodiments, when the value of the second field is all “0”, the third SRS resource set is applied for the at least one PUSCH transmission, and when the value of the second field is all “1”, the fourth SRS resource set is applied for the at least one PUSCH transmission.

In some example embodiments, when the first field indicates that the at least one PUSCH transmission is to be transmitted based on both of the third and fourth SRS resource sets, the second field is applied to indicate SRI(s) based on the third SRS resource set (for example, the second field is the first SRI field) or applied to indicate SRI(s) based on the fourth SRS resource set (for example, the second field is the second SRI field) or applied to indicate the TPC command for the first subset of PUSCH transmission(s) (for example, the second field is the first TPC field) or applied to indicate TPC command for the second subset of PUSCH transmission(s) (for example, the second field is the second TPC field) or applied to indicate OLPC parameters for the first subset of PUSCH transmission (s) (for example, the second field is the first OLPC parameter set indication field) or applied to indicate OLPC parameters for the second subset of PUSCH transmission (s) (for example, the second field is the second OLPC parameter set indication field).

Since the information about whether the at least one PUSCH transmission is to be transmitted based on a single-TRP or multi-TRP can be represented with 1-bit, the overhead of the newly-introduced first field can be minimized.

As discussed above, according to different PUSCH transmission schemes (such as, codebook based PUSCH transmission and non-codebook based PUSCH transmission), some fields, such as, the SRI field, TPMI field and TPC field, may be used to indicate the parameters for PUSCH transmissions.

As for multi-TRP, the first and second SRI fields, the first and second TPMI fields (for codebook based PUSCH transmission) and the first and second TPC fields (if present) may be used. Alternatively, as for single-TRP, the network device 110 merely needs to indicate one configured SRS resource set to the terminal device 120. Therefore, some fields in the DCI may be unused/reserved. In order to further reduce introducing additional overhead, the second field may reuse the used/reserved fields in the DCI.

In some example embodiments, the second field comprises at least one SRI field. More specifically, the network device 110 uses one SRI field to indicate configuration parameters used for the single-TRP, and then another SRI field may be used as the second field to indicate the index of the single SRS resource set.

Alternatively, or in addition, in some example embodiments, the second field comprises at least one TPMI field. More specifically, the network device 110 uses one TPMI field to indicate configuration parameters used for the single-TRP, and then another TPMI field may be used as the second field to indicate the index of the single SRS resource set.

Alternatively, or in addition, in some example embodiments, the second field comprises at least one TPC field. More specifically, the network device 110 uses one TPC field to indicate configuration parameters used for the single-TRP, and then another TPC field may be used as the second field to indicate the index of the single SRS resource set.

It should be understood that the above field reused by the second field are given for the purpose of illustration without suggesting any limitations. The second field may reuse other used fields in the DCI to avoid introducing additional overhead. Further, the second field may be a combination of more than one used field in the DCI.

In this way, by using the first field to indicate whether the at least one PUSCH transmission is to be transmitted based on the single SRS resource set or the plurality of SRS resource sets and reusing the unused/reserved field as the second field, the newly-introduced overhead may be minimized.

In some example embodiments, if the first field indicates single-TRP transmission, there are two codepoints in the second field, where the first codepoint indicates the first TRP 130-1, and the second codepoint indicates the second TRP 130-2. While if the first field indicates multi-TRP transmission, the second field is applied to indicate at least one of TPMI, SRI and TPC.

FIG. 3A and FIG. 3B illustrate examples of the first field 300 and the second field 350 of the present disclosure, respectively. As shown in FIG. 3A, the first field 300 is a single bit. The first field 300 may indicate single-TRP transmission or multi-TRP transmission by different bit values.

In the specific example shown in FIG. 3B, the second field 350 comprises codepoints B_i, B_i+1 and B_i_2, where codepoint B_i indicates the first TRP 130-1/SRS resource set if the single-TRP transmission/single SRS resource set is indicated by the first field, codepoint B_i+1 indicates that the second TRP 130-2/SRS resource set if the single-TRP transmission/single SRS resource set is indicated by the first field, and codepoint B_i+2 (if present) is reserved if the single-TRP transmission/single SRS resource sets is indicated in the first field. Although not shown in FIG. 3B, the second field may comprise other codepoint.

As discussed above, the DCI may comprise a plurality of SRI fields corresponding to the plurality of SRS resource sets. In this event, the network device 110 may determine which SRI may be reused as the second field. In some example embodiments, the first SRI field of the plurality of SRI fields is reused ad the second field. Alternatively, in some example embodiments, the second SRI field of the plurality of SRI fields is reused ad the second field. Alternatively, in some example embodiments, the last SRI field of the plurality of SRI fields is reused ad the second field. Alternatively, in some example embodiments, the last SRI field of the plurality of SRI fields is reused ad the second field. Alternatively, in some example embodiments, a SRI field of the plurality of SRI fields with the minimum bit size.

In addition, the DCI may comprise a plurality of TPMI fields corresponding to the plurality of SRS resource sets, and the network device 110 may determine which TPMI may be reused as the second field. In some example embodiments, the first TPMI field of the plurality of TPMI fields is reused ad the second field. Alternatively, in some example embodiments, the second TPMI field of the plurality of TPMI fields is reused ad the second field. Alternatively, in some example embodiments, the last TPMI field of the plurality of TPMI fields is reused ad the second field. Alternatively, in some example embodiments, the last TPMI field of the plurality of TPMI fields is reused ad the second field. Alternatively, in some example embodiments, a TPMI field of the plurality of TPMI fields with the minimum bit size.

In addition, the DCI may comprise a plurality of TPC fields corresponding to the plurality of SRS resource sets, and the network device 110 may determine which TPC may be reused as the second field. In some example embodiments, the first TPC field of the plurality of TPC fields is reused ad the second field. Alternatively, in some example embodiments, the second TPC field of the plurality of TPC fields is reused ad the second field. Alternatively, in some example embodiments, the last TPC field of the plurality of TPC fields is reused ad the second field. Alternatively, in some example embodiments, the last TPC field of the plurality of TPC fields is reused ad the second field. Alternatively, in some example embodiments, a TPC field of the plurality of TPC fields with the minimum bit size.

In the specific example of FIG. 2, the network device 110 may determine which one of the first or second SRI/TPMI/TPC field may be applied as second field base on the bit size of the above fields. As one example embodiment, when the number of SRS the numbers of SRS resources in the first is different from that of the second SRS resource set, the bit size of the first SRI field may be different from the bit size of the SRI field. The network device 110 may determine the field (such as, SRI field, TPMI field and TPC field) with the minimum bit size as the second field. That is, a function of Min (the first SRI/TPMI/TPC field, the second SRI/TPMI/TPC field) may be used to determine whether the first SRI/TPMI/TPC field or the second SRI/TPMI/TPC field may to be used as the second field.

In order to save overhead in the DCI, if the number of SRS resources comprised in a SRS resource set of the plurality of SRS resource sets is 1, or a number of SRS ports corresponding to a SRS resource set of the plurality of SRS resource sets is 1, the SRI field or the TPMI field may be absent from the DCI. Further, the TPC field is an additional field in the DCI. Therefore, for some specific scenario, some of the SRI fields, the TPMI fields and the TPC fields are not present.

In some example embodiments, if the number of bits for at least one of the TPMI field, the SRI field and the TPC field (such as, the second TPC field) is larger than 1, the corresponding field may be reused as the second field.

In one example embodiment, if a number of SRS resources comprised in a SRS resource set of the plurality of SRS resource sets is larger than 1, the second field indicates the index of the single SRS resource set by reusing the corresponding unused/reserved field. In another example embodiment, if a number of SRS ports corresponding to a SRS resource set of the plurality of SRS resource sets is larger than 1, the second field indicates the index of the single SRS resource set by reusing the corresponding unused/reserved field. In a further example embodiment, if a TPC field corresponding to a SRS resource set of the plurality of SRS resource sets is present, the second field indicates the index of the single SRS resource set by reusing the corresponding unused/reserved field. In a further another example embodiment if a SRI field corresponding to a SRS resource set of the plurality of SRS resource sets is present, the network the second field indicates the index of the single SRS resource set by reusing the corresponding unused/reserved field.

In addition, in some example embodiments, an order may be used by the network device 110 when determine which field to be reused as the second field. For example, the order to be used may be the SRI field (if present), the TPMI field (if be configured for codebook based transmission and if present), the TPC field (if be configured and if present).

In some example embodiments, the second field has a pre-defined value indicating the index of the single SRS resource set. For example, all the available SRI field and/or TPMI field, and/or TPC field may be combined as the second field. If all the bits in the second field are "0", the second field indicates that the first SRS resource/TRP is applied to the PUSCH transmissions, while if all the bits in the second field are "1", the second field indicates that the second SRS resource/TRP is applied to the PUSCH transmissions.

In this way, if there are fields that can be reused as the second field (for example, when the number of SRS resources is larger than 1, the number of SRS ports is larger than 1, or the TPC field (such as, the second TPC field) is present), the overhead of the first field can be minimized to be a one single bit.

As discussed above, for some specific scenario (for example, the number of SRS resources comprised in a SRS resource set of the plurality of SRS resource sets is 1, the number of SRS ports corresponding to a SRS resource set of the plurality of SRS resource sets is 1, the SRI/TPMI field is absent, or the TPC field is not configured), at least some of the SRI field, TPMI field and the TPC field are not present. If so, the second field may be absent, and further the index of the single SRS resource set may be determined based on a pre-defined configuration. In one example embodiment, when there is no field can be reused as the second field, it is assumed that the first TRP 130-1/SRS resource set is to be applied for the PUSCH transmissions. Alternatively, in another example embodiment, when there is no field can be reused as the second field, it is assumed that the second/last TRP/SRS resource set is to be applied for the PUSCH transmissions.

In this way, even there is no unused field to be reused as the second field and the second field is absent thereby, in case that the first indicates that the PUSCH transmission is to be transmitted based on a single-TRP/single SRS resource set, the index of the single SRS resource set still may be determined.

FIG. 4 illustrates an example of the first field 400 of the present disclosure when the second field is absent. As shown in FIG. 4, the first field 400 is a single bit. The first field 400 may indicate single-TRP transmission or multi-TRP transmission. After receiving the DCI, when the terminal determine 120 that the first field indicates single-TRP, the terminal device 120 may determine to use the pre-defined TRP/SRS resource set (such as, the first TRP 130-1/SRS resource set, the second TRP 130-2/SRS resource set or the last TRP/SRS resource set) to transmit the PUSCH transmissions.

Alternatively, if there is no field can be reused as the second field (for example, the number of SRS resources comprised in a SRS resource set of the plurality of SRS resource sets is 1, the number of SRS ports corresponding to a SRS resource set of the plurality of SRS resource sets is 1, the SRI/TPMI field is absent, or the TPC field is not configured), in order to ensure the bit size of the first field a 1-bit, the second field may be a newly-added field with a single bit merely for the scenario of single-TRP. Specifically, for multi-TRP, the first field is used to indicate that PUSCH transmission is to be transmitted based on multi-TRP, and the second field is absent. For single-TRP, the first field is used to indicate that PUSCH transmission is to be transmitted based on single-TRP, and a second field with 1-bit is used to indicate the index of the single SRS resource set.

FIG. 5A and FIG. 5B illustrate examples of the first field 500 and the second field 550 of the present disclosure, respectively. As shown in FIG. 5A, the first field 500 is a single bit. By using different bit values, the first field 500 may indicate single-TRP transmission or multi-TRP transmission.

Additionally, if the first field indicates that a single-TRP/SRS resource set is to be used for PUSCH transmission, a newly-added second field is needed. In the example shown in FIG. 5B, the second field 550 is a single bit. By using different bit values, the second field 550 may indicate different indexes of the different single SRS resource sets.

In this way, the newly-introduced overhead may be minimized because overhead of 2-bits (one bit used for the first field, and another bit used for the second field) are merely needed for some specific scenarios.

Except configuring the bit size of the first field to be a fixed size (i.e., 1-bit), the bit size of the first field may also be configured as a changeable or dynamic size. Many factors may influence the bit size of the first field. One example of the factor is the number of SRS resources comprised in a SRS resource set of the plurality of SRS resource sets. Another example of the factor is the number of SRS ports corresponding to a SRS resource set of the plurality of SRS resource sets. Further example of the factor is a determination whether a TPC field corresponding to a SRS resource set of the plurality of SRS resource sets is absent. Another further example of the factor is a determination whether a SRI field corresponding to a SRS resource set of the plurality of SRS resource sets is absent.

It should be understood that the above example factors relating to the bit size of the first field are given for the purpose of illustration without suggesting any limitations. In other example embodiments, the bit size of the first field may be determined by any other suitable factors.

In some example embodiments, the bit size of the first field is 1 if there are at least one unused field that can be reused as the second field (such as, a number of SRS resources comprised in a SRS resource set of the plurality of SRS resource sets being larger than 1, a number of SRS ports corresponding to a SRS resource set of the plurality of SRS resource sets being larger than 1 (for CB PUSCH transmission), a the TPC field (such as, the second TPC field) corresponding to a SRS resource set of the plurality of SRS resource sets being present, or a SRI field corresponding to a SRS resource set of the plurality of SRS resource sets being present).

Alternatively, in some example embodiments, the bit size of the first field is 2 if there is no unused field that can be reused as the second field (such as, the number of SRS resources comprised in a SRS resource set of the plurality of SRS resource sets being 1, the number of SRS ports corresponding to a SRS resource set of the plurality of SRS resource sets being 1 (for CB PUSCH transmission), the TPC field (such as, the second TPC field) corresponding to a SRS resource set of the plurality of SRS resource sets being s absent, or the SRI field corresponding to a SRS resource set of the plurality of SRS resource sets being absent).

Figure 6:
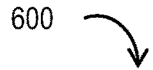
FIG. 6 illustrates an example of the first field of the present disclosure.

FIG. 6 illustrates an example of the first field 600 when there is no unused field that can be reused as the second field. As shown in FIG. 6, the first field 600 is 2-bits. The first field 600 may indicate single-TRP transmission or multi-TRP transmission and further may indicate the index of the single SRS resource set. In the specific example of FIG. 6, the first bit value (for example, "00") indicates multi-TRP transmission/a plurality of SRS resource sets, the second bit value (for example, "01") indicates single-TRP transmission/single SRS resource set with the first TRP 130-1/SRS resource set, the third bit value (for example, "10") indicates single-TRP transmission/single SRS resource set with the second TRP 130-2/SRS resource set, and the fourth bit value (for example, "11") may be reserved.

In this way, the overhead of the first field may be minimized, because the overhead of 2-bits of the first field is merely needed for some specific scenarios.

In some example embodiments, the network device 110 may transmit a DCI for scheduling the at least one PUSCH transmission to the terminal device 120. The DCI comprises a third field indicating that the at least one PUSCH transmission is to be transmitted based on a single SRS resource set (for example, the first SRS resource set or the second SRS resource set) or a plurality of SRS resource sets (for example, both the first SRS resource set and the second SRS resource set). Further, 2-bits are configured for the third field, and more information may be indicated by the third field. In some example embodiments, the information indicated by the third field may comprises whether the at least one PUSCH transmission is to be transmitted based on a single SRS resource set or a plurality of SRS resource sets. Additionally, the information may further comprise the index of the single SRS resource set when transmitting the at least one PUSCH transmission based on the single SRS resource set. Additionally, the information may also comprise at least one parameter set corresponding to at least one of the plurality of SRS resource sets when transmitting the at least one PUSCH transmission based on the plurality of SRS resource sets. The above information may be represented by different indications.

In some example embodiments, the third field may comprise a first indication, where the first indication indicates that the at least one PUSCH transmission is to be transmitted based on a single SRS resource set by using a first SRS resource set of a plurality of SRS resource sets. Alternatively, the third field may comprise a second indication, where in the second indication indicates that the at least one PUSCH transmission is to be transmitted based on a single SRS resource set by using a second SRS resource set of the plurality of SRS resource sets different from the first SRS resource set. Alternatively, the third field may comprise a third indication, where the third indication indicates that the at least one PUSCH transmission is to be transmitted based on the plurality of SRS resource sets and by using a first parameter set of the at least one parameter set. Alternatively, the third field may comprise a fourth indication, where the fourth indication indicates at least one PUSCH transmission is to be transmitted based on a plurality of SRS resource sets and by using a second parameter set of at least one parameter set different from the first parameter set.

In this way, the information about the at least one parameter set corresponding to at least one of the plurality of SRS resource sets may be indicates by the first field without introducing any additional overhead.

In some example embodiments, the at least one parameter set may comprise related parameter(s) relating to the at least one PUSCH transmission. One example of the related parameter is an open loop power control (OLPC) parameter associated with one of the plurality of SRS resource sets (for example, the second SRS resource set). Another example of the related parameter is a timing advance (TA) indication associated with one of the plurality of SRS resource sets (for example, the second SRS resource set). A further example of the related parameter is a timing advance group (TAG) indication associated with one of the plurality of SRS resource sets (for example, the second SRS resource set). A further another example of the related parameter is an order of the plurality of SRS resource sets to be used by the terminal device.

In some example embodiments, a first codepoint in the third field may indicate both of the plurality of SRS resource sets (such as, the first and second resource sets) are applied for the at least one PUSCH transmission, and the first codepoint indicates that a first parameter is applied for the second subset of PUSCH transmission. A second codepoint in the third field may indicate both of the plurality of SRS resource sets (such as, the first and second resource sets) are applied for the at least one PUSCH transmission, and the second codepoint indicates that a second parameter is applied for the second subset of PUSCH transmission. A third codepoint in the third field may indicate that the first SRS resource set is applied for the at least one PUSCH transmission. A fourth codepoint in the third field may indicate that the second SRS resource set is applied for the at least one PUSCH transmission. In some example embodiments, the first parameter and the second parameter may be applied to indicate at least one of OLPC parameters, TA value and TAG indication.

FIG. 7 illustrates an example of the first field 700. As shown in FIG. 7, the first field 700 is 2-bits. In the specific example of FIG. 7, the first bit value (for example, “00”) indicates multi-TRP transmission/a plurality of SRS resource sets and further indicates that the second TRP or the second SRS resource set or the second subset of PUSCH transmission(s) applies a first parameter set (such as, the first OLPC parameter set), the second bit value (for example, “01”) indicates single-TRP transmission/single SRS resource set with the first TRP 130-1/SRS resource set, the third bit value (for example, “10”) indicates single-TRP transmission/single SRS resource set with the second TRP 130-2/SRS resource set, and the fourth bit value (for example, “11”) indicates that multi-TRP transmission/a plurality of SRS resource sets and further indicates that the second TRP 130-2 or the second SRS resource set or the second subset of PUSCH transmission(s) applies a second parameter set (such as, the second OLPC parameter set). In some example embodiments, the first and the second OLPC parameter sets may be configured via at least one of RRC, MAC CE and DCI.

After receiving the DCI message, the terminal device 120 may determine the schedule information configured by the network device 110 for the PUSCH transmissions. Then the terminal device 120 may transmit 220 the PUSCH transmissions to the network device 110 based on the DCI.

In this way, the dynamic switching between single-TRP transmission and multi-TRP transmission may be achieved without introducing significant overhead.

In some example embodiments, the network device 110 may configure a first SRS resource set and a second SRS resource set to the terminal device 120. There may be X SRS resources in the first SRS resource set, X is positive integer. For example, X may be any one of {1, 2, 3, 4}. There may be Y SRS resources in the second resource set, Y is positive integer. For example, Y may be any one of {1, 2, 3, 4}. In one example, X may be different from Y. In another example, X may be same as Y. In some example embodiments, the first SRI field in the DCI may be associated or correspond to one of the SRS resource set with more SRS resources. In some example embodiments, if X>=Y, then the first SRI field in the DCI is associated with or correspond to the first SRS resource set (for example, the first TRP), and the second SRI field in the DCI is associated with or correspond to the second SRS resource set (for example, the second TRP). In some example embodiments, if X<Y, then the first SRI field in the DCI is associated with or correspond to the second SRS resource set (for example, the second TRP), and the second SRI field in the DCI is associated with or correspond to the first SRS resource set (for example, the first TRP).

In some example embodiments, the network device 110 may configure two values of maxRank (for example, maxRank_1 and maxRank_2) for codebook based uplink/PUSCH transmission, where maxRank_1 and maxRank_2 are both positive integer. For example, maxRank_1 may be any one of {1, 2, 3, 4}, and maxRank_2 may be any one of {1, 2, 3, 4}. In one example, maxRank_1 may be different from maxRank 2. In another example, maxRank_1 may be same as maxRank_2. In some example embodiments, maxRank_1 may be applied/associated with the first SRS resource set, and maxRank_2 may be applied/associated with the second SRS resource set. In some example embodiments, the first TPMI field in the DCI may be associated or correspond to one of the SRS resource set with larger value of maxRank. In some example embodiments, if maxRank_1>=maxRank_2, then the first TPMI field in the DCI is associated with or correspond to the first SRS resource set (for example, the first TRP), and the second TPMI field in the DCI is associated with or correspond to the second SRS resource set (for example, the second TRP). In some example embodiments, if maxRank_1<maxRank_2, then the first TPMI field in the DCI is associated with or correspond to the second SRS resource set (for example, the second TRP), and the second TPMI field in the DCI is associated with or correspond to the first SRS resource set (for example, the first TRP).

In some example embodiments, for non-codebook based multi-TRP PUSCH, the number of bits, $N_2$, for the second SRI field is determined by the maximum number of codepoint(s) per rank among all ranks supported based on the number of SRS resources in the second SRS resource set and/or the value of Lmax (for example, support by the second TRP). The first SRI field is used to determine the entry of the second SRI field which only contains the SRI(s) combinations corresponding to the indicated rank (number of layers) of the first SRI field in case of multi-TRP transmission. For example, in case of multi-TRP transmission, for each rank x, the first $K_x$ codepoint(s) are mapped to $K_x$ SRIs of rank x associated with the first SRI field, the remaining $(2^{N_2}-K_x)$ codepoint(s) are reserved. For another example, in case of single-TRP transmission, for each rank w, the first $K_w$ codepoint(s) are mapped to $K_w$ SRIs of rank w supported based on the number of SRS resources in the second SRS resource set and/or the value of Lmax, the remaining $(2^{N_2}-K_w)$ codepoint(s) are reserved.

In some example embodiments, for codebook based multi-TRP PUSCH, the second TPMI field's bit width, $M_2$, is determined by the maximum number of TPMIs per rank among all ranks supported based on maxRank_2 (for example, maxRank for the second TRP). In some example embodiments, the first TPMI field is used to determine the entry of the second TPMI field which only contains TPMIs corresponding to the indicated rank (number of layers) of the first TPMI field in case of multi-TRP transmission. For example, in case of multi-TRP transmission, for each rank y, the first $K_y$ codepoint(s) of the second TPMI field are mapped to $K_y$. TPMI(s) of rank y associated with the first TPMI field in increasing order codepoint index, the remaining $(2^{M2}-K_y)$ codepoint(s) are reserved. For another example, in case of single-TRP transmission, for each rank z, the first $K_z$ codepoint(s) of the second TPMI field are mapped to $K_z$ TPMI(s) of rank z supported based on max Rank for the second TRP in increasing order codepoint index, the remaining $(2^{M2}-K_z)$ codepoint(s) are reserved.

Figure 8:
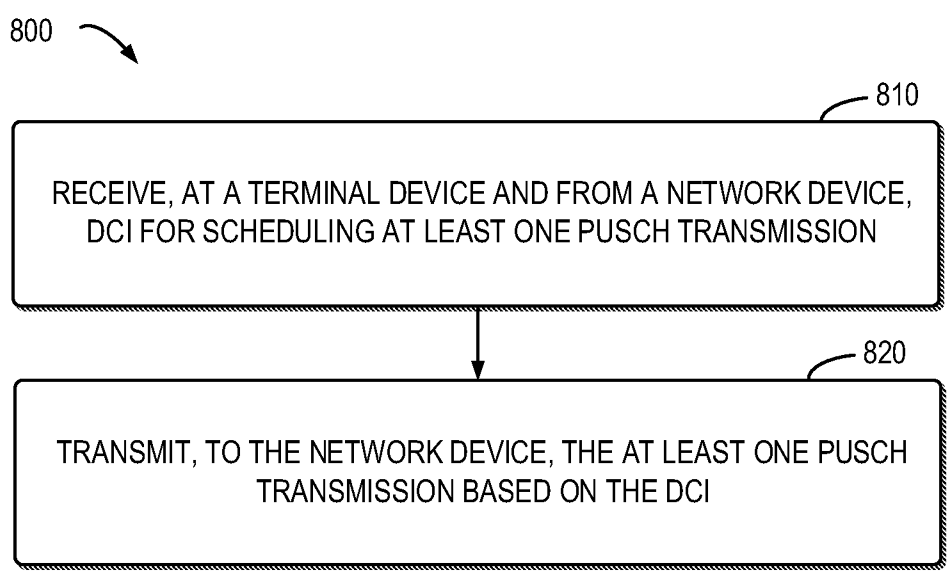
FIG. 8 illustrates a flowchart of an example method performed by a terminal device in accordance with some embodiments of the present disclosure.

FIG. 8 illustrates a flowchart of an example method 800 in accordance with some embodiments of the present disclosure. For example, the method 800 can be implemented at the terminal device 120 as shown in FIGS. 1A and 1B.

At block 810, the terminal device 120 receives a DCI for scheduling at least one PUSCH transmission from a network device 110. The DCI comprises a first field indicating that the at least one PUSCH transmission is to be transmitted based on a SRS resource set from a plurality of SRS resource sets or the plurality of SRS resource sets, and a second field indicating an index of the single SRS resource set for transmitting the at least one PUSCH transmission.

At block 820, the terminal device 120 transmits the at least one PUSCH transmission based on the DCI to the network device 110.

In some example embodiments, the second field comprises at least one of the following: at least one SRI field, at least one TPMI field, or at least one TPC field.

In some example embodiments, the DCI comprises a plurality of SRI fields corresponding to the plurality of SRS resource sets. The second field is one of the following: the first SRI field of the plurality of SRI fields, the second SRI field of the plurality of SRI fields, the last SRI field of the plurality of SRI fields, or a SRI field of the plurality of SRI fields with the minimum bit size.

In some example embodiments, the second field indicates the index of the single SRS resource set if a number of SRS resources comprised in a SRS resource set of the plurality of SRS resource sets is larger than 1.

In some example embodiments, the second field indicates the index of the single SRS resource set if a number of SRS ports corresponding to a SRS resource set of the plurality of SRS resource sets is larger than 1.

In some example embodiments, the second field indicates the index of the single SRS resource set if a TPC field corresponding to a SRS resource set of the plurality of SRS resource sets is present.

In some example embodiments, the second field indicates the index of the single SRS resource set if a SRI field corresponding to a SRS resource set of the plurality of SRS resource sets is present.

In some example embodiments, the second field has a pre-defined value indicating the index of the single SRS resource set.

In some example embodiments, the index of the single SRS resource set is determined based on a pre-defined configuration, if the first field indicates that the at least one PUSCH transmission is to be transmitted based on the single SRS resource set and if a number of SRS resources comprised in a SRS resource set of the plurality of SRS resource sets is 1.

In some example embodiments, the index of the single SRS resource set is determined based on a pre-defined configuration, if the first field indicates that the at least one PUSCH transmission is to be transmitted based on the single SRS resource set and if a number of SRS ports corresponding to a SRS resource set of the plurality of SRS resource sets is 1.

In some example embodiments, the index of the single SRS resource set is determined based on a pre-defined configuration, if the first field indicates that the at least one PUSCH transmission is to be transmitted based on the single SRS resource set and if a TPC field corresponding to a SRS resource set of the plurality of SRS resource sets is absent.

In some example embodiments, the index of the single SRS resource set is determined based on a pre-defined configuration, if the first field indicates that the at least one PUSCH transmission is to be transmitted based on the single SRS resource set and if a SRI field corresponding to a SRS resource set of the plurality of SRS resource sets is absent.

In some example embodiments, the second field comprises a single bit, if the first field indicates that the at least one PUSCH transmission is to be transmitted based on the single SRS resource set, and if a number of SRS resources comprised in a SRS resource set of the plurality of SRS resource sets is 1.

In some example embodiments, the second field comprises a single bit, if the first field indicates that the at least one PUSCH transmission is to be transmitted based on the single SRS resource set, and if a number of SRS ports corresponding to a SRS resource set of the plurality of SRS resource sets is 1.

In some example embodiments, the second field comprises a single bit, if the first field indicates that the at least one PUSCH transmission is to be transmitted based on the single SRS resource set, and if a TPC field corresponding to a SRS resource set of the plurality of SRS resource sets is absent.

In some example embodiments, the second field comprises a single bit, if the first field indicates that the at least one PUSCH transmission is to be transmitted based on the single SRS resource set, and if a SRR field corresponding to a SRS resource set of the plurality of SRS resource sets is absent.

In some example embodiments, the plurality of SRS resource sets comprise a first SRS resource set and a second SRS resource set.

In some example embodiments, the first field comprises a single bit.

In some example embodiments, a bit size of the first field is determined according to at least one of the following: a number of SRS resources comprised in a SRS resource set of the plurality of SRS resource sets, a number of SRS ports corresponding to a SRS resource set of the plurality of SRS resource sets, a determination whether a TPC field corresponding to a SRS resource set of the plurality of SRS resource sets is absent, or a determination whether a SRI field corresponding to a SRS resource set of the plurality of SRS resource sets is absent.

In some example embodiments, the bit size of the first field is 1, if a number of SRS resources comprised in a SRS resource set of the plurality of SRS resource sets is larger than 1.

In some example embodiments, the bit size of the first field is 1, if a number of SRS ports corresponding to a SRS resource set of the plurality of SRS resource sets is larger than 1.

In some example embodiments, the bit size of the first field is 1, if a TPC field corresponding to a SRS resource set of the plurality of SRS resource sets is present.

In some example embodiments, the bit size of the first field is 1, if a SRI field corresponding to a SRS resource set of the plurality of SRS resource sets is present.

In some example embodiments, the bit size of the first field is 2, if a number of SRS resources comprised in a SRS resource set of the plurality of SRS resource sets is 1.

In some example embodiments, the bit size of the first field is 2, if a number of SRS ports corresponding to a SRS resource set of the plurality of SRS resource sets is 1.

In some example embodiments, the bit size of the first field is 2, if a TPC field corresponding to a SRS resource set of the plurality of SRS resource sets is absent.

In some example embodiments, the bit size of the first field is 2, if a SRI field corresponding to a SRS resource set of the plurality of SRS resource sets is absent.

Figure 9:
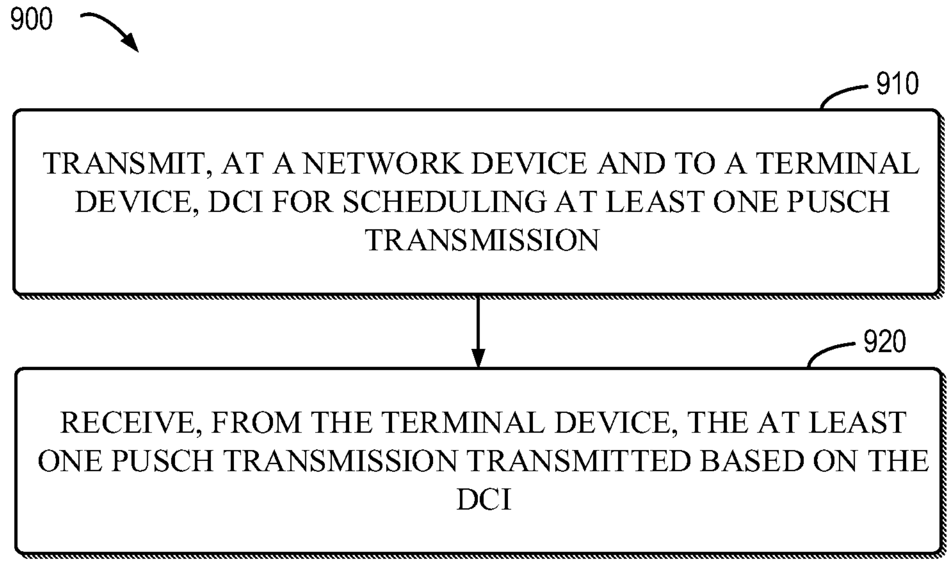
FIG. 9 illustrates a flowchart of an example method performed by a network device in accordance with some embodiments of the present disclosure.

FIG. 9 illustrates a flowchart of an example method 900 in accordance with some embodiments of the present disclosure. For example, the method 900 can be implemented at the terminal device 120 as shown in FIGS. 1A and 1B.

At block 910, the network device 110 transmits DCI for scheduling at least one PUSCH transmission to the terminal device 120. The DCI comprises a first field indicating that the at least one PUSCH transmission is to be transmitted based on a single SRS resource set from a plurality of SRS resource sets or the plurality of SRS resource sets, and a second field indicating an index of the single SRS resource set for transmitting the at least one PUSCH transmission.

At block 920, the network device 110 receives the at least one PUSCH transmission transmitted based on the DCI from the terminal device 120.

In some example embodiments, the second field comprises at least one of the following: at least one SRI field, at least one TPMI field, or at least one TPC field.

In some example embodiments, the DCI comprises a plurality of SRI fields corresponding to the plurality of SRS resource sets. The second field is one of the following: the first SRI field of the plurality of SRI fields, the second SRI field of the plurality of SRI fields, the last SRI field of the plurality of SRI fields, or a SRI field of the plurality of SRI fields with the minimum bit size.

In some example embodiments, the second field indicates the index of the single SRS resource set if a number of SRS resources comprised in a SRS resource set of the plurality of SRS resource sets is larger than 1.

In some example embodiments, the second field indicates the index of the single SRS resource set if a number of SRS ports corresponding to a SRS resource set of the plurality of SRS resource sets is larger than 1.

In some example embodiments, the second field indicates the index of the single SRS resource set if a TPC field corresponding to a SRS resource set of the plurality of SRS resource sets is present.

In some example embodiments, the second field indicates the index of the single SRS resource set if a SRI field corresponding to a SRS resource set of the plurality of SRS resource sets is present.

In some example embodiments, the second field has a pre-defined value indicating the index of the single SRS resource set.

In some example embodiments, the index of the single SRS resource set is determined based on a pre-defined configuration, if the first field indicates that the at least one PUSCH transmission is to be transmitted based on the single SRS resource set and if a number of SRS resources comprised in a SRS resource set of the plurality of SRS resource sets is 1.

In some example embodiments, the index of the single SRS resource set is determined based on a pre-defined configuration, if the first field indicates that the at least one PUSCH transmission is to be transmitted based on the single SRS resource set and if a number of SRS ports corresponding to a SRS resource set of the plurality of SRS resource sets is 1.

In some example embodiments, the index of the single SRS resource set is determined based on a pre-defined configuration, if the first field indicates that the at least one PUSCH transmission is to be transmitted based on the single SRS resource set and if a TPC field corresponding to a SRS resource set of the plurality of SRS resource sets is absent.

In some example embodiments, the index of the single SRS resource set is determined based on a pre-defined configuration, if the first field indicates that the at least one PUSCH transmission is to be transmitted based on the single SRS resource set and if a SRI field corresponding to a SRS resource set of the plurality of SRS resource sets is absent.

In some example embodiments, the second field comprises a single bit, if the first field indicates that the at least one PUSCH transmission is to be transmitted based on the single SRS resource set, and if a number of SRS resources comprised in a SRS resource set of the plurality of SRS resource sets is 1.

In some example embodiments, the second field comprises a single bit, if the first field indicates that the at least one PUSCH transmission is to be transmitted based on the single SRS resource set, and if a number of SRS ports corresponding to a SRS resource set of the plurality of SRS resource sets is 1.

In some example embodiments, the second field comprises a single bit, if the first field indicates that the at least one PUSCH transmission is to be transmitted based on the single SRS resource set, and if a TPC field corresponding to a SRS resource set of the plurality of SRS resource sets is absent.

In some example embodiments, the second field comprises a single bit, if the first field indicates that the at least one PUSCH transmission is to be transmitted based on the single SRS resource set, and if a SRR field corresponding to a SRS resource set of the plurality of SRS resource sets is absent.

In some example embodiments, the plurality of SRS resource sets comprise a first SRS resource set and a second SRS resource set.

In some example embodiments, the first field comprises a single bit.

In some example embodiments, a bit size of the first field is determined according to at least one of the following: a number of SRS resources comprised in a SRS resource set of the plurality of SRS resource sets, a number of SRS ports corresponding to a SRS resource set of the plurality of SRS resource sets, a determination whether a TPC field corresponding to a SRS resource set of the plurality of SRS resource sets is absent, or a determination whether a SRI field corresponding to a SRS resource set of the plurality of SRS resource sets is absent.

In some example embodiments, the bit size of the first field is 1, if a number of SRS resources comprised in a SRS resource set of the plurality of SRS resource sets is larger than 1.

In some example embodiments, the bit size of the first field is 1, if a number of SRS ports corresponding to a SRS resource set of the plurality of SRS resource sets is larger than 1.

In some example embodiments, the bit size of the first field is 1, if a TPC field corresponding to a SRS resource set of the plurality of SRS resource sets is present.

In some example embodiments, the bit size of the first field is 1, if a SRI field corresponding to a SRS resource set of the plurality of SRS resource sets is present.

In some example embodiments, the bit size of the first field is 2, if a number of SRS resources comprised in a SRS resource set of the plurality of SRS resource sets is 1.

In some example embodiments, the bit size of the first field is 2, if a number of SRS ports corresponding to a SRS resource set of the plurality of SRS resource sets is 1, In some example embodiments, the bit size of the first field is 2, if a TPC field corresponding to a SRS resource set of the plurality of SRS resource sets is absent, or In some example embodiments, the bit size of the first field is 2, if a SRI field corresponding to a SRS resource set of the plurality of SRS resource sets is absent.

Figure 10:
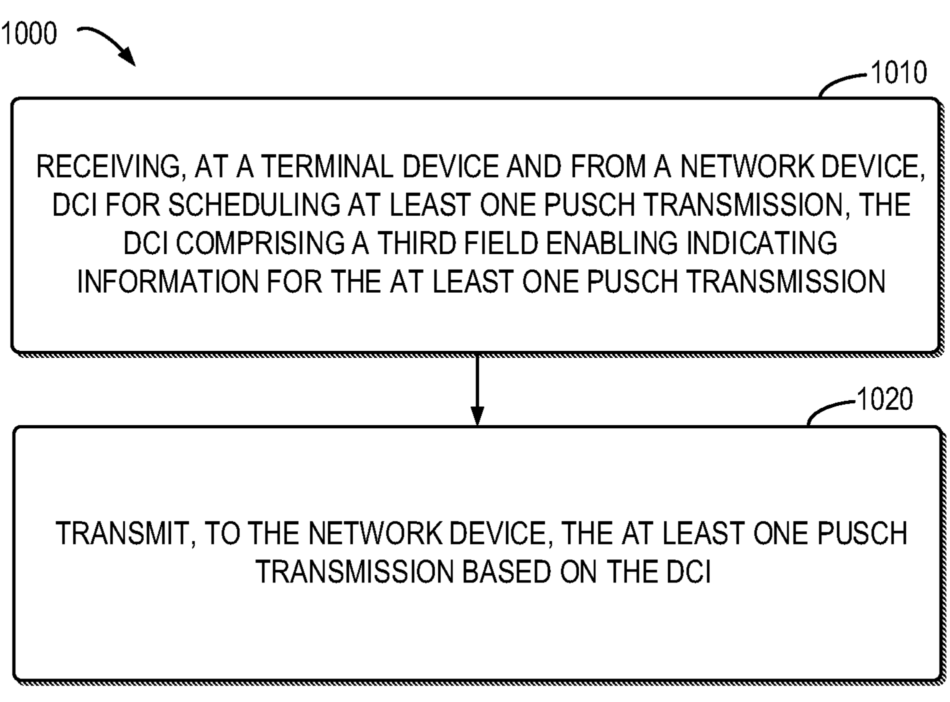
FIG. 10 illustrates a flowchart of an example method performed by a terminal device in accordance with some embodiments of the present disclosure.

FIG. 10 illustrates a flowchart of an example method 1000 in accordance with some embodiments of the present disclosure. For example, the method 1000 can be implemented at the terminal device 120 as shown in FIGS. 1A and 1B.

At block 1010, the terminal device 120 receives a DCI for scheduling at least one PUSCH transmission from a network device 110. The DCI comprises a third field enabling indicating information for the at least one PUSCH transmission. The information comprises whether the at least one PUSCH transmission is to be transmitted based on a single SRS resource set or a plurality of SRS resource sets, an index of the single SRS resource set when transmitting the at least one PUSCH transmission based on the single SRS resource set, and at least one parameter set corresponding to at least one of the plurality of SRS resource sets when transmitting the at least one PUSCH transmission based on the plurality of SRS resource sets.

At block 1020, the terminal device 120 transmits the at least one PUSCH transmission based on the DCI to the network device 110.

In some example embodiments, the third field comprises one of the following: a first indication, indicating that the at least one PUSCH transmission is to be transmitted based on a single SRS resource set by using a first SRS resource set of a plurality of SRS resource sets, a second indication, indicating that the at least one PUSCH transmission is to be transmitted based on a single SRS resource set by using a second SRS resource set of the plurality of SRS resource sets different from the first SRS resource set, a third indication, indicating that the at least one PUSCH transmission is to be transmitted based on the plurality of SRS resource sets and by using a first parameter set of the at least one parameter set, and a fourth indication, indicating at least one PUSCH transmission is to be transmitted based on a plurality of SRS resource sets and by using a second parameter set of at least one parameter set different from the first parameter set.

In some example embodiments, at least one parameter set comprising at least one of the following: an OLPC parameter associated with at least one SRS resource set of the plurality of SRS resource sets, a TA indication associated with at least one SRS resource set of the plurality of SRS resource sets, a TAG indication associated with at least one SRS resource set of the plurality of SRS resource sets, or an order of the plurality of SRS resource sets to be used by the terminal device 120.

In some example embodiments, the plurality of SRS resource sets comprise a first SRS resource set and a second SRS resource set.

Figure 11:
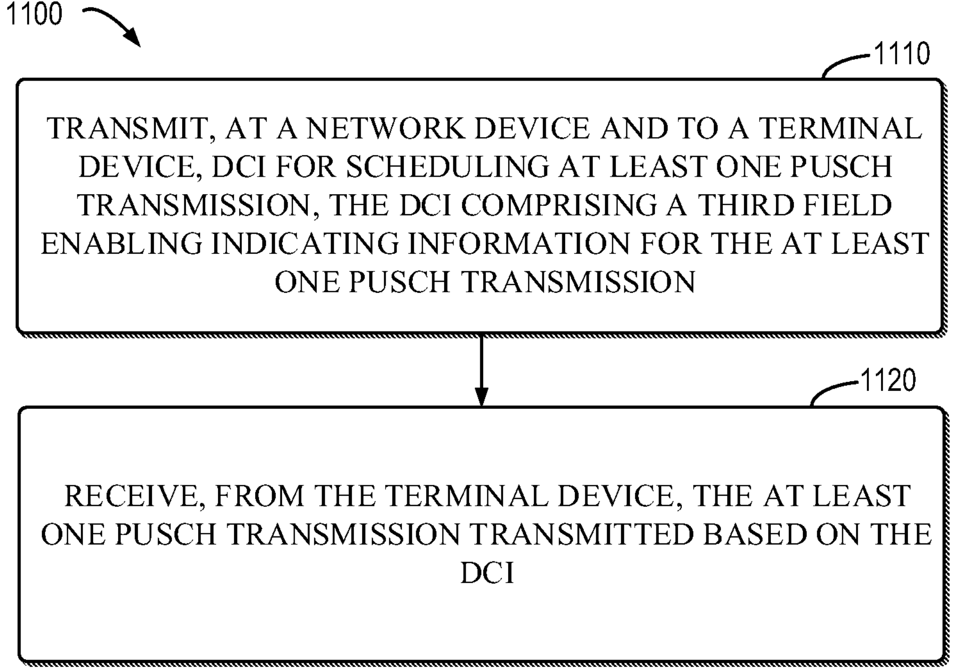
FIG. 11 illustrates a flowchart of an example method performed by a network device in accordance with some embodiments of the present disclosure.

FIG. 11 illustrates a flowchart of an example method 1100 in accordance with some embodiments of the present disclosure. For example, the method 1100 can be implemented at the terminal device 120 as shown in FIGS. 1A and 1B.

At block 1110, the terminal device 120 receives DCI for scheduling at least one PUSCH transmission from the network device 110. The DCI comprises a first field indicating that the at least one PUSCH transmission is to be transmitted based on a single SRS resource set from a plurality of SRS resource sets or the plurality of SRS resource sets, and a second field indicating an index of the single SRS resource set for transmitting the at least one PUSCH transmission.

At block 1120, the terminal device 120 transmits the at least one PUSCH transmission transmitted based on the DCI from the terminal device 120.

In some example embodiments, the third field comprises one of the following: a first indication, indicating that the at least one PUSCH transmission is to be transmitted based on a single SRS resource set by using a first SRS resource set of a plurality of SRS resource sets, a second indication, indicating that the at least one PUSCH transmission is to be transmitted based on a single SRS resource set by using a second SRS resource set of the plurality of SRS resource sets different from the first SRS resource set, a third indication, indicating that the at least one PUSCH transmission is to be transmitted based on the plurality of SRS resource sets and by using a first parameter set of the at least one parameter set, and a fourth indication, indicating at least one PUSCH transmission is to be transmitted based on a plurality of SRS resource sets and by using a second parameter set of at least one parameter set different from the first parameter set.

In some example embodiments, at least one parameter set comprising at least one of the following: an OLPC parameter associated with at least one SRS resource set of the plurality of SRS resource sets, a TA indication associated with at least one SRS resource set of the plurality of SRS resource sets, a TAG indication associated with at least one SRS resource set of the plurality of SRS resource sets, or an order of the plurality of SRS resource sets to be used by the terminal device 120.

In some example embodiments, the plurality of SRS resource sets comprise a first SRS resource set and a second SRS resource set.

In some example embodiments, the terminal device 120 comprises circuitry configured to: receive a DCI for scheduling at least one PUSCH transmission from a network device 110. The DCI comprises a first field indicating that the at least one PUSCH transmission is to be transmitted based on a SRS resource set from a plurality of SRS resource sets or the plurality of SRS resource sets, and a second field indicating an index of the single SRS resource set for transmitting the at least one PUSCH transmission. The circuitry is further configured to transmit the at least one PUSCH transmission based on the DCI to the network device 110.

In some example embodiments, the second field comprises at least one of the following: at least one SRI field, at least one TPMI field, or at least one TPC field.

In some example embodiments, the DCI comprises a plurality of SRI fields corresponding to the plurality of SRS resource sets. The second field is one of the following: the first SRI field of the plurality of SRI fields, the second SRI field of the plurality of SRI fields, the last SRI field of the plurality of SRI fields, or a SRI field of the plurality of SRI fields with the minimum bit size.

In some example embodiments, the second field indicates the index of the single SRS resource set if a number of SRS resources comprised in a SRS resource set of the plurality of SRS resource sets is larger than 1.

In some example embodiments, the second field indicates the index of the single SRS resource set if a number of SRS ports corresponding to a SRS resource set of the plurality of SRS resource sets is larger than 1.

In some example embodiments, the second field indicates the index of the single SRS resource set if a TPC field corresponding to a SRS resource set of the plurality of SRS resource sets is present.

In some example embodiments, the second field indicates the index of the single SRS resource set if a SRI field corresponding to a SRS resource set of the plurality of SRS resource sets is present.

In some example embodiments, the second field has a pre-defined value indicating the index of the single SRS resource set.

In some example embodiments, the index of the single SRS resource set is determined based on a pre-defined configuration, if the first field indicates that the at least one PUSCH transmission is to be transmitted based on the single SRS resource set and if a number of SRS resources comprised in a SRS resource set of the plurality of SRS resource sets is 1.

In some example embodiments, the index of the single SRS resource set is determined based on a pre-defined configuration, if the first field indicates that the at least one PUSCH transmission is to be transmitted based on the single SRS resource set and if a number of SRS ports corresponding to a SRS resource set of the plurality of SRS resource sets is 1.

In some example embodiments, the index of the single SRS resource set is determined based on a pre-defined configuration, if the first field indicates that the at least one PUSCH transmission is to be transmitted based on the single SRS resource set and if a TPC field corresponding to a SRS resource set of the plurality of SRS resource sets is absent.

In some example embodiments, the index of the single SRS resource set is determined based on a pre-defined configuration, if the first field indicates that the at least one PUSCH transmission is to be transmitted based on the single SRS resource set and if a SRI field corresponding to a SRS resource set of the plurality of SRS resource sets is absent.

In some example embodiments, the second field comprises a single bit, if the first field indicates that the at least one PUSCH transmission is to be transmitted based on the single SRS resource set, and if a number of SRS resources comprised in a SRS resource set of the plurality of SRS resource sets is 1.

In some example embodiments, the second field comprises a single bit, if the first field indicates that the at least one PUSCH transmission is to be transmitted based on the single SRS resource set, and if a number of SRS ports corresponding to a SRS resource set of the plurality of SRS resource sets is 1.

In some example embodiments, the second field comprises a single bit, if the first field indicates that the at least one PUSCH transmission is to be transmitted based on the single SRS resource set, and if a TPC field corresponding to a SRS resource set of the plurality of SRS resource sets is absent.

In some example embodiments, the second field comprises a single bit, if the first field indicates that the at least one PUSCH transmission is to be transmitted based on the single SRS resource set, and if a SRR field corresponding to a SRS resource set of the plurality of SRS resource sets is absent.

In some example embodiments, the plurality of SRS resource sets comprise a first SRS resource set and a second SRS resource set.

In some example embodiments, the first field comprises a single bit.

In some example embodiments, a bit size of the first field is determined according to at least one of the following: a number of SRS resources comprised in a SRS resource set of the plurality of SRS resource sets, a number of SRS ports corresponding to a SRS resource set of the plurality of SRS resource sets, a determination whether a TPC field corresponding to a SRS resource set of the plurality of SRS resource sets is absent, or a determination whether a SRI field corresponding to a SRS resource set of the plurality of SRS resource sets is absent.

In some example embodiments, the bit size of the first field is 1, if a number of SRS resources comprised in a SRS resource set of the plurality of SRS resource sets is larger than 1.

In some example embodiments, the bit size of the first field is 1, if a number of SRS ports corresponding to a SRS resource set of the plurality of SRS resource sets is larger than 1.

In some example embodiments, the bit size of the first field is 1, if a TPC field corresponding to a SRS resource set of the plurality of SRS resource sets is present.

In some example embodiments, the bit size of the first field is 1, if a SRI field corresponding to a SRS resource set of the plurality of SRS resource sets is present.

In some example embodiments, the bit size of the first field is 2, if a number of SRS resources comprised in a SRS resource set of the plurality of SRS resource sets is 1.

In some example embodiments, the bit size of the first field is 2, if a number of SRS ports corresponding to a SRS resource set of the plurality of SRS resource sets is 1.

In some example embodiments, the bit size of the first field is 2, if a TPC field corresponding to a SRS resource set of the plurality of SRS resource sets is absent.

In some example embodiments, the bit size of the first field is 2, if a SRI field corresponding to a SRS resource set of the plurality of SRS resource sets is absent.

In some example embodiments, the network device 110 comprises circuitry configured to transmit DCI for scheduling at least one PUSCH transmission to the terminal device 120. The DCI comprises a first field indicating that the at least one PUSCH transmission is to be transmitted based on a single SRS resource set from a plurality of SRS resource sets or the plurality of SRS resource sets, and a second field indicating an index of the single SRS resource set for transmitting the at least one PUSCH transmission. The circuitry is further configured to receive the at least one PUSCH transmission transmitted based on the DCI from the terminal device 120.

In some example embodiments, the second field comprises at least one of the following: at least one SRI field, at least one TPMI field, or at least one TPC field.

In some example embodiments, the DCI comprises a plurality of SRI fields corresponding to the plurality of SRS resource sets. The second field is one of the following: the first SRI field of the plurality of SRI fields, the second SRI field of the plurality of SRI fields, the last SRI field of the plurality of SRI fields, or a SRI field of the plurality of SRI fields with the minimum bit size.

In some example embodiments, the second field indicates the index of the single SRS resource set if a number of SRS resources comprised in a SRS resource set of the plurality of SRS resource sets is larger than 1.

In some example embodiments, the second field indicates the index of the single SRS resource set if a number of SRS ports corresponding to a SRS resource set of the plurality of SRS resource sets is larger than 1.

In some example embodiments, the second field indicates the index of the single SRS resource set if a TPC field corresponding to a SRS resource set of the plurality of SRS resource sets is present.

In some example embodiments, the second field indicates the index of the single SRS resource set if a SRI field corresponding to a SRS resource set of the plurality of SRS resource sets is present.

In some example embodiments, the second field has a pre-defined value indicating the index of the single SRS resource set.

In some example embodiments, the index of the single SRS resource set is determined based on a pre-defined configuration, if the first field indicates that the at least one PUSCH transmission is to be transmitted based on the single SRS resource set and if a number of SRS resources comprised in a SRS resource set of the plurality of SRS resource sets is 1.

In some example embodiments, the index of the single SRS resource set is determined based on a pre-defined configuration, if the first field indicates that the at least one PUSCH transmission is to be transmitted based on the single SRS resource set and if a number of SRS ports corresponding to a SRS resource set of the plurality of SRS resource sets is 1.

In some example embodiments, the index of the single SRS resource set is determined based on a pre-defined configuration, if the first field indicates that the at least one PUSCH transmission is to be transmitted based on the single SRS resource set and if a TPC field corresponding to a SRS resource set of the plurality of SRS resource sets is absent.

In some example embodiments, the index of the single SRS resource set is determined based on a pre-defined configuration, if the first field indicates that the at least one PUSCH transmission is to be transmitted based on the single SRS resource set and if a SRI field corresponding to a SRS resource set of the plurality of SRS resource sets is absent.

In some example embodiments, the second field comprises a single bit, if the first field indicates that the at least one PUSCH transmission is to be transmitted based on the single SRS resource set, and if a number of SRS resources comprised in a SRS resource set of the plurality of SRS resource sets is 1.

In some example embodiments, the second field comprises a single bit, if the first field indicates that the at least one PUSCH transmission is to be transmitted based on the single SRS resource set, and if a number of SRS ports corresponding to a SRS resource set of the plurality of SRS resource sets is 1.

In some example embodiments, the second field comprises a single bit, if the first field indicates that the at least one PUSCH transmission is to be transmitted based on the single SRS resource set, and if a TPC field corresponding to a SRS resource set of the plurality of SRS resource sets is absent.

In some example embodiments, the second field comprises a single bit, if the first field indicates that the at least one PUSCH transmission is to be transmitted based on the single SRS resource set, and if a SRR field corresponding to a SRS resource set of the plurality of SRS resource sets is absent.

In some example embodiments, the plurality of SRS resource sets comprise a first SRS resource set and a second SRS resource set.

In some example embodiments, the first field comprises a single bit.

In some example embodiments, a bit size of the first field is determined according to at least one of the following: a number of SRS resources comprised in a SRS resource set of the plurality of SRS resource sets, a number of SRS ports corresponding to a SRS resource set of the plurality of SRS resource sets, a determination whether a TPC field corresponding to a SRS resource set of the plurality of SRS resource sets is absent, or a determination whether a SRI field corresponding to a SRS resource set of the plurality of SRS resource sets is absent.

In some example embodiments, the bit size of the first field is 1, if a number of SRS resources comprised in a SRS resource set of the plurality of SRS resource sets is larger than 1.

In some example embodiments, the bit size of the first field is 1, if a number of SRS ports corresponding to a SRS resource set of the plurality of SRS resource sets is larger than 1.

In some example embodiments, the bit size of the first field is 1, if a TPC field corresponding to a SRS resource set of the plurality of SRS resource sets is present.

In some example embodiments, the bit size of the first field is 1, if a SRI field corresponding to a SRS resource set of the plurality of SRS resource sets is present.

In some example embodiments, the bit size of the first field is 2, if a number of SRS resources comprised in a SRS resource set of the plurality of SRS resource sets is 1.

In some example embodiments, the bit size of the first field is 2, if a number of SRS ports corresponding to a SRS resource set of the plurality of SRS resource sets is 1.

In some example embodiments, the bit size of the first field is 2, if a TPC field corresponding to a SRS resource set of the plurality of SRS resource sets is absent.

In some example embodiments, the bit size of the first field is 2, if a SRI field corresponding to a SRS resource set of the plurality of SRS resource sets is absent.

In some example embodiments, the terminal device 120 comprises circuitry configured to receive a DCI for scheduling at least one PUSCH transmission from a network device 110. The DCI comprises a third field enabling indicating information for the at least one PUSCH transmission. The information comprises whether the at least one PUSCH transmission is to be transmitted based on a single SRS resource set or a plurality of SRS resource sets, an index of the single SRS resource set when transmitting the at least one PUSCH transmission based on the single SRS resource set, and at least one parameter set corresponding to at least one of the plurality of SRS resource sets when transmitting the at least one PUSCH transmission based on the plurality of SRS resource sets. The circuitry is further configured to transmit the at least one PUSCH transmission based on the DCI to the network device 110.

In some example embodiments, the third field comprises one of the following: a first indication, indicating that the at least one PUSCH transmission is to be transmitted based on a single SRS resource set by using a first SRS resource set of a plurality of SRS resource sets, a second indication, indicating that the at least one PUSCH transmission is to be transmitted based on a single SRS resource set by using a second SRS resource set of the plurality of SRS resource sets different from the first SRS resource set, a third indication, indicating that the at least one PUSCH transmission is to be transmitted based on the plurality of SRS resource sets and by using a first parameter set of the at least one parameter set, and a fourth indication, indicating at least one PUSCH transmission is to be transmitted based on a plurality of SRS resource sets and by using a second parameter set of at least one parameter set different from the first parameter set.

In some example embodiments, at least one parameter set comprising at least one of the following: an OLPC parameter associated with at least one SRS resource set of the plurality of SRS resource sets, a TA indication associated with at least one SRS resource set of the plurality of SRS resource sets, a TAG indication associated with at least one SRS resource set of the plurality of SRS resource sets, or an order of the plurality of SRS resource sets to be used by the terminal device 120.

In some example embodiments, the plurality of SRS resource sets comprise a first SRS resource set and a second SRS resource set.

In some example embodiments, the network device 110 comprises circuitry configured to transmit, to a terminal device 120, DCI for scheduling at least one PUSCH transmission. The DCI comprises a third field enabling indicating information for the at least one PUSCH transmission. The information comprises whether the at least one PUSCH transmission is to be transmitted based on a single SRS resource set or a plurality of SRS resource sets, an index of the single SRS resource set when transmitting the at least one PUSCH transmission based on the single SRS resource set, and at least one parameter set corresponding to at least one of the plurality of SRS resource sets when transmitting the at least one PUSCH transmission based on the plurality of SRS resource sets. The circuitry is further configured to receives, from the terminal device 120, the at least one PUSCH transmission transmitted based on the DCI.

In some example embodiments, the third field comprises one of the following: a first indication, indicating that the at least one PUSCH transmission is to be transmitted based on a single SRS resource set by using a first SRS resource set of a plurality of SRS resource sets, a second indication, indicating that the at least one PUSCH transmission is to be transmitted based on a single SRS resource set by using a second SRS resource set of the plurality of SRS resource sets different from the first SRS resource set, a third indication, indicating that the at least one PUSCH transmission is to be transmitted based on the plurality of SRS resource sets and by using a first parameter set of the at least one parameter set, and a fourth indication, indicating at least one PUSCH transmission is to be transmitted based on a plurality of SRS resource sets and by using a second parameter set of at least one parameter set different from the first parameter set.

In some example embodiments, at least one parameter set comprising at least one of the following: an OLPC parameter associated with at least one SRS resource set of the plurality of SRS resource sets, a TA indication associated with at least one SRS resource set of the plurality of SRS resource sets, a TAG indication associated with at least one SRS resource set of the plurality of SRS resource sets, or an order of the plurality of SRS resource sets to be used by the terminal device 120.

In some example embodiments, the plurality of SRS resource sets comprise a first SRS resource set and a second SRS resource set.

Figure 12:
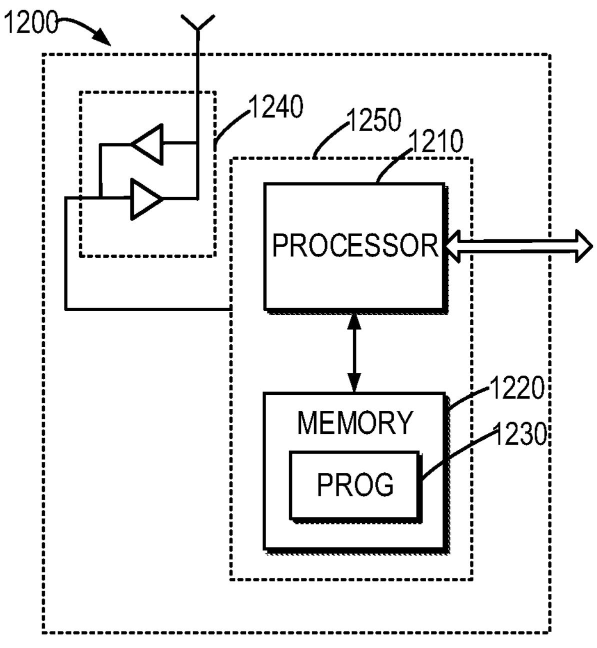
FIG. 12 is a simplified block diagram of a device that is suitable for implementing embodiments of the present disclosure.

FIG. 12 is a simplified block diagram of a device 1200 that is suitable for implementing embodiments of the present disclosure. The device 1200 can be considered as a further example implementation of the network device 110 and/or the terminal device 120 as shown in FIGS. 1A and 1B. Accordingly, the device 1200 can be implemented at or as at least a part of the network device 110 and/or the terminal device 120 as shown in FIG. 1A and FIG. 1B.

As shown, the device 1200 includes a processor 1210, a memory 1220 coupled to the processor 1210, a suitable transmitter (TX) and receiver (RX) 1240 coupled to the processor 1210, and a communication interface coupled to the TX/RX 1240. The memory 1210 stores at least a part of a program 1230. The TX/RX 1240 is for bidirectional communications. The TX/RX 1240 has at least one antenna to facilitate communication, though in practice an Access Node mentioned in this application may have several ones. The communication interface may represent any interface that is necessary for communication with other network elements, such as X2 interface for bidirectional communications between eNBs, SI interface for communication between a Mobility Management Entity (MME)/Serving Gateway (S-GW) and the eNB, Un interface for communication between the eNB and a relay node (RN), or Uu interface for communication between the eNB and a terminal device 120.

The program 1230 is assumed to include program instructions that, when executed by the associated processor 1210, enable the device 1200 to operate in accordance with the embodiments of the present disclosure, as discussed herein with reference to FIGS. 2 to 11. The embodiments herein may be implemented by computer software executable by the processor 1210 of the device 1200, or by hardware, or by a combination of software and hardware. The processor 1210 may be configured to implement various embodiments of the present disclosure. Furthermore, a combination of the processor 1210 and memory 1220 may form processing means 1250 adapted to implement various embodiments of the present disclosure.

The memory 1220 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1220 is shown in the device 1200, there may be several physically distinct memory modules in the device 1200. The processor 1210 may be of any type suitable to the local technical network, and may include one or more of general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2-11. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of communication performed by a terminal device, comprising:

receiving, from a network device, a downlink control information (DCI) scheduling a Physical Uplink Shared Channel (PUSCH), wherein the DCI comprises a first field indicating one or both of a first sounding reference signal (SRS) resource set and a second SRS resource set are used for transmission of the PUSCH; and transmitting, to the network device, the PUSCH based on a parameter defining the maximum number of layers applied for the first SRS resource set and the second SRS resource set in a case where the first field indicates the first SRS resource set is used for transmission of a first subset of the PUSCH and the second SRS resource set is used for transmission of a second subset of the PUSCH, the value range of the maximum number is {1, 2}.

2. The method of claim 1, wherein the DCI comprises a second field indicating a first number of layers associated with the first SRS resource set and a third field indicating a second number of layers associated with the second SRS resource set, the first number is smaller than or equal to the maximum number defined by the parameter and the second number is smaller than or equal to the maximum number defined by the parameter.

3. The method of claim 1, wherein the first field comprises a first indication indicating the PUSCH is based on a first parameter set and a second indication indicating the PUSCH is based on a second parameter set, and each of the first parameter set and the second parameter set comprises at least one of: open loop power control parameter, timing advance indication and timing advance group (TAG) indication.

4. A method of communication performed by a network device, comprising:

transmitting, to a terminal device, a downlink control information (DCI) scheduling a Physical Uplink Shared Channel (PUSCH), wherein the DCI comprises a first field indicating one or both of a first sounding reference signal (SRS) resource set and a second SRS resource set are used for transmission of the PUSCH; and receiving, from the terminal device, the PUSCH based on a parameter defining the maximum number of layers applied for the first SRS resource set and the second SRS resource set in a case where the first field indicates the first SRS resource set is used for transmission of a first subset of the PUSCH and the second SRS resource set is used for transmission of a second subset of the PUSCH, the value range of the maximum number is {1, 2}.

5. The method of claim 4, wherein the DCI comprises a second field indicating a first number of layers associated with the first SRS resource set and a third field indicating a second number of layers associated with the second SRS resource set, the first number is smaller than or equal to the maximum number defined by the parameter and the second number is smaller than or equal to the maximum number defined by the parameter.

6. The method of claim 4, wherein the first field comprises a first indication indicating the PUSCH is based on a first parameter set and a second indication indicating the PUSCH is based on a second parameter set, and each of the first parameter set and the second parameter set comprises at least one of: open loop power control parameter, timing advance indication and timing advance group (TAG) indication.

7. A terminal device, comprising:

a processor configured to cause the terminal device to:

receive, from a network device, a downlink control information (DCI) scheduling a physical uplink shared channel (PUSCH), wherein the DCI comprises a first field indicating one or both of a first sounding reference signal (SRS) resource set and a second SRS resource set are used for transmission of the PUSCH; and transmit, to the network device, the PUSCH based on a parameter defining the maximum number of layers applied for the first SRS resource set and the second SRS resource set in a case where the first field indicates the first SRS resource set is used for transmission of a first subset of the PUSCH and the second SRS resource set is used for transmission of a second subset of the PUSCH, the value range of the maximum number is {1, 2}.

8. The terminal device of claim 7, wherein the DCI comprises a second field indicating a first number of layers associated with the first SRS resource set and a third field indicating a second number of layers associated with the second SRS resource set, the first number is smaller than or equal to the maximum number defined by the parameter and the second number is smaller than or equal to the maximum number defined by the parameter.

9. The terminal device of claim 7, wherein the first field comprises a first indication indicating the PUSCH is based on a first parameter set and a second indication indicating the PUSCH is based on a second parameter set, and each of the first parameter set and the second parameter set comprises at least one of: open loop power control parameter, timing advance indication and timing advance group (TAG) indication.

* * * * *